United States Patent
Wilde et al.

(10) Patent No.: US 9,127,774 B2
(45) Date of Patent: Sep. 8, 2015

(54) CONTROL VALVE ASSEMBLY

(75) Inventors: Glenn Wilde, Calgary (CA); Dennis Jonk, Calgary (CA)

(73) Assignee: OPTIMUM PRODUCTION TECHNOLOGIES INC., Calgary (CA)

(*) Notice: Subject to any disclaimer, the term of this patent is extended or adjusted under 35 U.S.C. 154(b) by 640 days.

(21) Appl. No.: 13/599,294

(22) Filed: Aug. 30, 2012

(65) Prior Publication Data

US 2012/0318523 A1 Dec. 20, 2012

Related U.S. Application Data

(63) Continuation of application No. 12/878,017, filed on Sep. 8, 2010, now abandoned, and a continuation-in-part of application No. PCT/CA2010/000319, filed on Mar. 4, 2010.

(60) Provisional application No. 61/157,300, filed on Mar. 4, 2009, provisional application No. 61/229,673, filed on Jul. 29, 2009.

(51) Int. Cl.
| | | |
|---|---|---|
| *E21B 43/12* | (2006.01) | |
| *F16K 7/07* | (2006.01) | |
| *E21B 34/06* | (2006.01) | |
| *E21B 44/00* | (2006.01) | |
| *F16K 31/42* | (2006.01) | |

(52) U.S. Cl.
CPC ............... *F16K 7/075* (2013.01); *E21B 34/06* (2013.01); *E21B 43/12* (2013.01); *E21B 44/00* (2013.01); *F16K 31/42* (2013.01)

(58) Field of Classification Search
CPC ........................................................ E21B 43/12

USPC .................. 700/282; 166/370, 319, 332.1
See application file for complete search history.

(56) References Cited

U.S. PATENT DOCUMENTS

| | | | |
|---|---|---|---|
| 4,785,841 | A | 11/1988 | Breckner |
| 6,991,034 | B2 | 1/2006 | Wilde |
| 7,275,599 | B2 | 10/2007 | Wilde |
| 7,419,132 | B2 | 9/2008 | McCausland |
| 2005/0167156 | A1 | 8/2005 | Zupanick |
| 2007/0162235 | A1 | 7/2007 | Zhan et al. |

FOREIGN PATENT DOCUMENTS

| | | |
|---|---|---|
| GB | 2439488 | 12/2007 |
| JP | 8338541 | 12/1996 |

OTHER PUBLICATIONS

International Preliminary Report on Patentability, Chapter II, re PCT/CA2010/000319.

*Primary Examiner* — Tejal Gami
(74) *Attorney, Agent, or Firm* — Donald V. Tomkins

(57) ABSTRACT

In a system for optimizing natural gas production in response to real-time variations in wellbore parameters, a PLC or other wellsite intelligence technology is used to monitor liquid and gas production from the wellbore under friction-loaded conditions. Using baseline production data obtained during production tests, the PLC determines and initiates the appropriate operating mode for the wellbore to optimize a selected production criterion to suit measured wellbore parameters. The operating mode either a continuous clean-out mode, in which gas is continuously injected into the wellbore to control liquid loading, or an intermittent clean-out, in which liquid loading is regulated by intermittent gas injection. In preferred embodiments, the system uses bladder-type control valves having upstream and downstream solenoids, to control production tubing flow rate within a range between upper and lower set points.

18 Claims, 12 Drawing Sheets

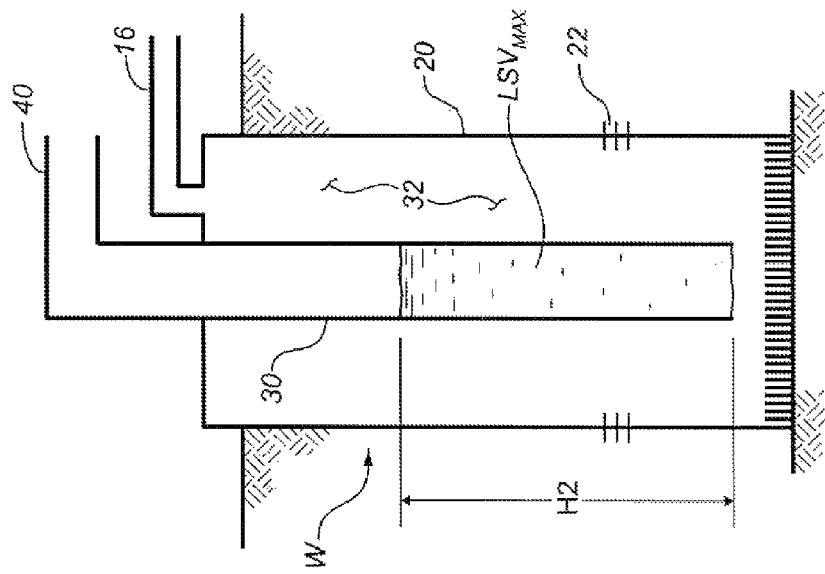
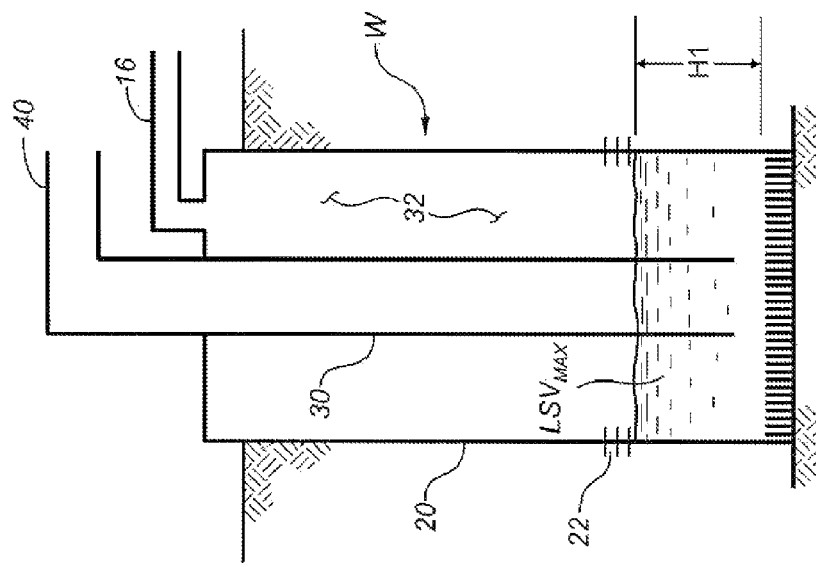

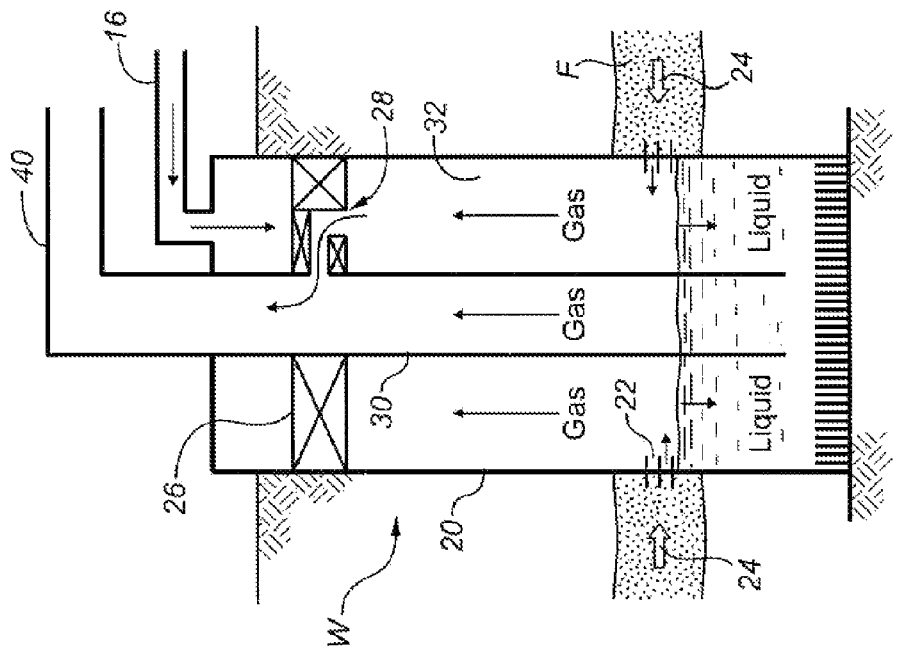
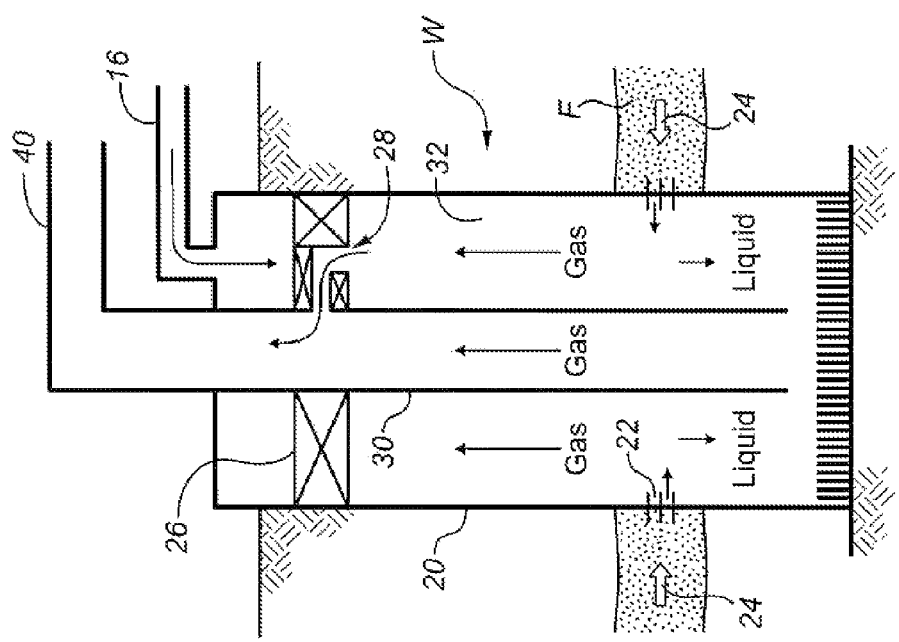

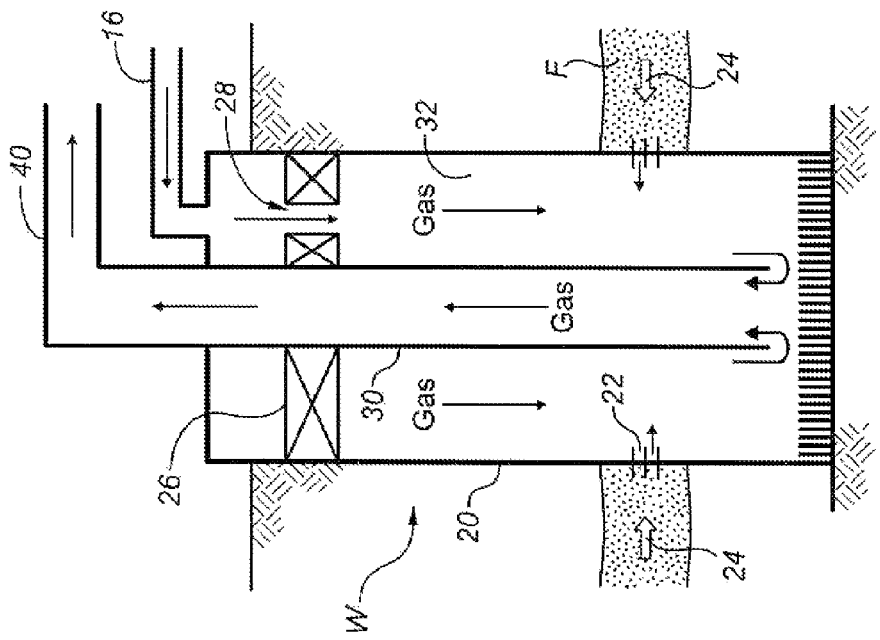
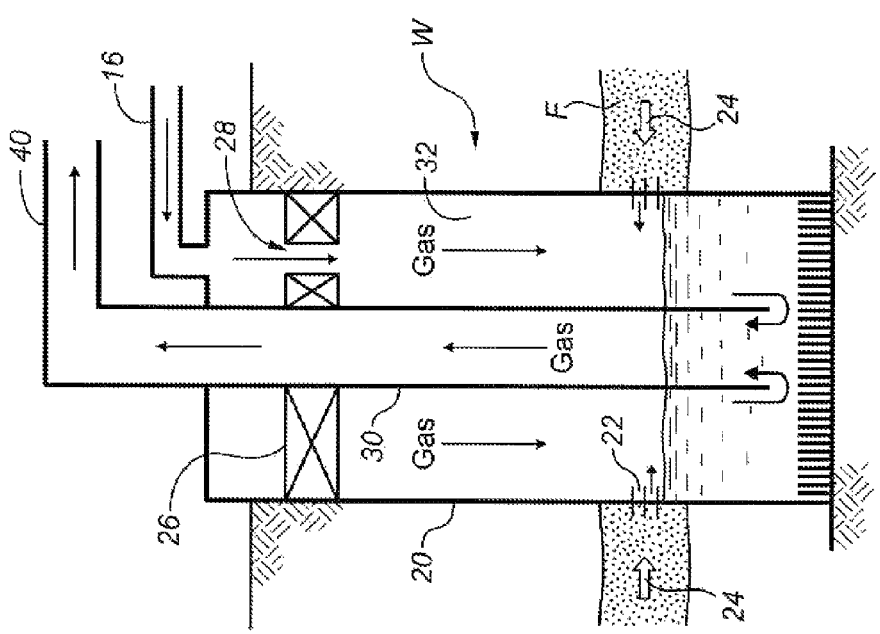

CONTROL VALVE ASSEMBLY

CROSS-REFERENCE TO RELATED APPLICATIONS

This application is a continuation of pending U.S. patent application Ser. No. 12/878,017, which is a continuation-in-part (CIP) of International Application No. PCT/CA2010/000319, which designates the United States and has an international filing date of Mar. 4, 2010. PCT/CA2010/000319 claims the benefit, pursuant to 35 U.S.C. 119(e), of U.S. Patent Application No. 61/157,300, filed Mar. 4, 2009, and U.S. Patent Application No. 61/229,673, filed Jul. 29, 2009. All four said earlier applications are incorporated herein by reference in their entirety for continuity of disclosure.

FIELD OF THE INVENTION

The present invention relates to methods and apparatus for optimizing production in natural gas wells, particularly in gas wells producing with fixed-velocity lift systems. The present invention further relates to flow control valves adaptable for use in conjunction with gas well production optimization methods and systems, particularly including flow control valves that operate with no atmospheric venting.

BACKGROUND OF THE INVENTION

Natural gas is commonly found in subsurface geological formations such as deposits of granular material (e.g., sand or gravel), coal, shale, or porous rock. Production of natural gas from these types of formations typically involves drilling a well a desired depth into the formation, installing a casing in the wellbore (to keep the well bore from sloughing and collapsing), perforating the casing in the production zone (i.e., the portion of the well that penetrates the gas-bearing formation) so that gas can flow into the casing, and installing a string of tubing inside the casing down to the production zone. Gas can then be made to flow up to the surface through a production chamber, which may be either the tubing or the annulus between the tubing and the casing.

Formation liquids, including water, oil, and/or hydrocarbon condensates, are generally present with natural gas in a subsurface reservoir. For reasons explained in greater detail hereinafter, these liquids must be lifted along with the gas. In order for this to happen, one of the following flow regimes must be present in the well:

Pressure-Induced Flow

In a pressure-induced flow regime, the formation pressure (i.e., the pressure of the fluids flowing into the well) is greater than the hydrostatic pressure from the column of fluids (gas and liquids) in the production chamber. In other words, the formation pressure is sufficient to lift the liquids along with the gas. Pressure-induced flow occurs in wells producing from reservoirs having a non-depleting pressure; i.e., where the reservoir pressure is high enough that production from the reservoir results in no significant drop in formation pressure. This type of flow regime is common in reservoirs under water flood or having an active water drive providing pressure support. Conventional gas lift technology may be used to enhance flow in a pressure-induced flow regime by lightening the hydrostatic weight of total fluids in the production chamber.

Pressure-induced flow is most commonly associated with wells that are primarily oil-producing wells, and is rarely associated with primarily gas-producing wells.

Velocity-Induced Flow

This type of flow occurs with gas reservoirs having a depleting pressure, and it is common in most gas reservoirs and all solution-gas-driven oil reservoirs. The present invention is concerned with velocity-induced flow, a general explanation of which follows.

In order to optimize total volumes and rates of gas recovery from a gas reservoir, the bottomhole flowing pressure should be kept as low as possible. The theoretically ideal case would be to have a negative bottomhole flowing pressure so as to facilitate 100% gas recovery from the reservoir, resulting in a final reservoir pressure of zero.

When natural gas is flowing up a well, formation liquids will tend to be entrained in the gas stream, in the form of small droplets. As long as the gas is flowing upward at or above a critical velocity (or "$V_{CR}$"—the value of which depends on various well-specific factors), the droplets will be lifted along with the gas to the wellhead, where the gas-liquid mixture may be separated using well-known equipment and methods. In this situation, the gas velocity provides the means for lifting the liquids; i.e., the well is producing gas by velocity-induced flow.

The critical velocity $V_{CR}$ for a given wellbore will be dependent on a number of factors which may vary from one wellbore to the next, and which are subject to change over the life of the wellbore. Such factors may include, but are not necessarily limited to, reservoir pressure, flow line pressure, liquid production rate, liquid composition, gas composition, and wellbore design.

Formation pressures in virgin reservoirs of natural gas tend to be relatively high. Therefore, upon initial completion of a well, the gas will commonly rise naturally to the surface by velocity-induced flow provided that the characteristics of the reservoir and the wellbore are suitable to produce stable flow (meaning that the gas velocity at all locations in the production chamber remains equal to or greater than the critical velocity, $V_{CR}$—in other words, velocity-induced flow). Typically these wells will flow with excess velocity (i.e., significantly greater than $V_{CR}$), resulting in friction between the flowing fluids and the production chamber.

As gas reserves are removed, the formation pressure drops continuously, resulting in reduced fluid velocities in the wellbore. Lower fluid velocity provides the benefit of reduced friction loading; however, it also diminishes the water-lifting capability of the wellbore. Once the gas velocity has become too low to lift liquids, the liquids accumulate in the wellbore, and the well is said to be "liquid loaded". This accumulation of liquids results in increased bottomhole flowing pressures and reduced gas recoveries. In this situation, continued gas production from the well requires the use of mechanical methods and apparatus in order to remove liquids from the wellbore and to restore stable flow.

In summary, gas wellbores are subject to two types of loading: (1) friction loading and (2) liquid loading.

Friction loading is caused by fluid flowing up the production tubing at high velocity, and results in restricted formation drawdown. Friction loading typically will not "kill" a well (i.e., completely halt the production of well fluids); however, it can significantly restrict production. The remedy or solution for friction loading is to reduce fluid velocities—e.g., by reducing gas flow rates (thus reducing gas velocity), or by increasing production chamber size while maintaining flow rates (thus reducing gas velocity).

Liquid loading is caused by insufficient fluid velocity up the production tubing. Like friction loading, liquid loading results in restricted formation drawdown. Liquid loading will eventually result in the well being killed. Any time a wellbore is "killed" (i.e., its production of well fluids is stopped) due to excessive liquids, considerable costs must be incurred to correct the problem and restore production from the well.

As discussed above, liquid loading can be reduced or eliminated by increasing fluid flow velocity to produce velocity-induced flow conditions. However, increased flow velocity also promotes increased friction loading. Current wellbore design methods typically provide excess flow velocity (i.e., significantly higher than $V_{CR}$) to eliminate liquid loading and ensure that the well does not die. The resultant friction loading is accepted as the lesser of two evils.

In order to maintain long-term stable production rates from any gas well, the first priority is to ensure that the wellbore is substantially free from accumulation of liquids. If liquids production is substantial, any accumulation of liquids in the wellbore must be removed, either continuously or intermittently depending on the rate of accumulation. In cases where liquids are removed on an intermittent basis, the well would alternate between production and clean-out cycles, with the clean-out cycle beginning when accumulated liquids reach an undesirable level, and with gas production necessarily being stopped during the clean-out cycle.

In accordance with the preceding discussion, it can be appreciated that production optimization for a gas well requiring removal of liquids can be achieved by keeping the fluid velocity as close as practically possible to the well's critical velocity, in order to prevent accumulation of liquids while minimizing friction loading.

U.S. Pat. No. 6,991,034 and corresponding International Application No. PCT/CA2004/000478 teach methods and apparatus for enhancing natural gas well productivity by maintaining a velocity-induced flow regime, thus providing for continuous removal of liquids from the well and preventing or mitigating liquid loading and friction loading of the well. In accordance with U.S. Pat. No. 6,991,034, a supplementary pressurized gas is injected into a first (or injection) chamber of a gas well as necessary to keep the total upward gas flow rate in a second (or production) chamber of the well at or above a minimum flow rate needed to lift liquids within the upward gas flow. A cased well having a string of tubing may be considered as having two chambers (namely, the bore of the tubing, and the annulus between the tubing and the casing), and either of these chambers can serve as the first (or injection) chamber, with the other serving as the second (or production) chamber.

The invention of U.S. Pat. No. 6,991,034 provides for a gas injection pipeline, for injecting the supplemental gas into the injection chamber, and further provides a throttling valve (also referred to as a "choke") for controlling the rate of gas injection, and, more specifically, for maintaining a gas injection rate sufficient to keep the gas flowing up the production chamber at or above a set point established with reference to a critical flow rate. Strictly speaking, the critical flow rate is a well-specific gas velocity above which liquids will not drop out of an upward-flowing gas stream (as previously explained). However, the critical flow rate for a given wellbore may also be expressed in terms of volumetric flow based on the critical gas velocity and the cross-sectional area of the production chamber.

As explained in U.S. Pat. No. 6,991,034, the critical flow rate for a particular well may be determined using methods or formulae well known to those skilled in the art. A "set point" (i.e., minimum rate of total gas flow in the production chamber) is then selected, for purposes of controlling the operation of the choke. The set point may correspond to the critical flow rate, but more typically will correspond to a value higher than the critical flow rate, in order to provide a margin of safety.

Once the well has been brought into production, an actual total gas flow rate in the production chamber is measured. If the measured total gas flow rate (without gas injection) is at or above the set point, the choke will remain closed, and no gas will be injected into the well. However, if the measured total gas flow rate is below the set point, the choke will be opened so that gas is injected into the injection chamber at a sufficient rate to raise the total gas flow rate in the production chamber to a level at or above the set point.

Gas productions systems as taught in U.S. Pat. No. 6,991, 034 may be referred to as fixed-velocity production systems.

U.S. Pat. No. 7,275,599 (and corresponding International Application No. PCT/CA2004/001567) teach methods and apparatus whereby the intake pipeline running between the production chamber of a natural gas well and the suction inlet of an associated wellhead compressor is completely enclosed within a vapour-tight jacket of natural gas under positive pressure (i.e., greater than atmospheric pressure). Being enclosed inside this "positive-pressure jacket", the intake pipeline is "blanketed" with positive-pressure gas and therefore is not exposed to the atmosphere at any point. This allows gas to be drawn into the compressor through the intake pipeline under a negative pressure (i.e., lower than atmospheric pressure), without risk of air entering the intake pipeline should a leak occur in the pipeline. If such a leak occurs, there would merely be a harmless transfer of gas from the positive pressure jacket into the intake pipeline. Should a leak develop in the positive pressure jacket, gas therefrom will escape into the atmosphere, and entry of air into the positive pressure jacket will be impossible. As taught in U.S. Pat. No. 7,275, 599, these teachings can be readily adapted for use in conjunction with wells producing gas under velocity-induced flow conditions in accordance with methods taught in U.S. Pat. No. 6,991,034.

Extensive scientific research has developed a number of flow correlations that predict downhole velocities in flowing wellbores. The oil and gas industry relies on these correlations to predict critical flow rates, and attempts to design production tubing strings such that fluid velocities will equal or exceed predicted critical velocities. However, experience with wellbore modeling indicates that some wells are capable of lifting liquids at velocities considerably below the predicted critical velocity, and some wells can become liquid loaded despite producing at fluid velocities well above the predicted critical velocity.

The ideal solution for optimizing a wellbore producing with a fixed-velocity lift system is to determine whether it requires continuous liquids removal, or whether it would be more optimally produced at velocities below critical with reduced friction loading, accompanied by intermittent removal of liquids. In other words, a well that liquid-loads over a period of (for example) ten days would benefit from intermittent clean-outs, while a well that loads over a period of one hour would require continuous liquids removal.

For the foregoing reasons, there is a need for systems and methods for:
- automatically determining whether continuous or intermittent clean-out of liquids is the optimal production mode for a given wellbore, having regard to wellbore and formation properties;
- automatically determining the optimum duration of production and clean-out cycles for wells utilizing an intermittent clean-out system;
- automatically determining the optimal production chamber (e.g., either the tubing or the casing annulus), and switching fluid flow in the wellbore accordingly; and automatically determining actual critical velocities for producing wellbores, and for maintaining the set point substantially equal to the actual critical velocities for wellbores utilizing a continuous clean-out system.

Any system or method directed to the foregoing needs will necessarily entail use of flow control devices. Control valves of various types are commonly used to control the flow of both liquid and gaseous fluids. Flow control may be achieved using a control valve in combination with a controller (i.e., a device incorporating a processor and a memory, such as but not limited to a pneumatic controller or a programmable logic controller (PLC)) that compare one or more flow variables (such as but not limited to flow rate, pressure, and temperature) against pre-established values (or "set points"). In response to corresponding signals from the controller, the control valve either opens (partially or fully) or closes as necessary to maintain the flow variable(s) in question at the appropriate set point(s).

As used in this patent document, the term "control valve" may be understood as referring to either a discrete control valve or to a control valve assembly that incorporates a control valve, according to the context. A typical conventional control valve assembly (such as, for example, the Fisher® D (globe-style) or DA (angle-style) valve) includes a valve body, internal valve trim ("valve trim" being a term readily understood by persons skilled in the art), and a valve actuator. A conventional control valve assembly will commonly be provided in conjunction with additional accessories such as (but not limited to) positioners and proportional controllers. These accessories provide a means to enter a control set point for the control valve. Each configuration for a conventional control valve typically provides a relatively narrow capacity range for a given set of process conditions. Due to this narrow capacity range and the inherent complexity of the control valve, maintenance and design must be done by professional instrumentation personnel. As a result, conventional control valves are relatively expensive to purchase and maintain.

Most if not all control valves commonly used in the natural gas industry are pneumatically driven, and their operation typically results in the venting of methane gas to the atmosphere. In the past, this undesirable operational characteristic was considered tolerable in view of the reliability of such pneumatically-actuated control valves. However, with the increasing focus on reducing greenhouse gas emissions and improving system efficiencies, there is an increasing incentive to find environmentally-friendly alternative methods and apparatus for controlling fluid flow and pressure.

Electric actuators can be used to eliminate the venting of gas. However, electric actuators are comparatively expensive and have significant electrical power requirements, with correspondingly high operating costs.

For the foregoing reasons, it is desirable to have a comparatively simple and inexpensive control valve that can control fluid flow effectively under a broad range of process conditions with minimal power consumption and absolutely no external venting of gas. Such a control valve would ideally be serviceable by any ordinarily-skilled field personnel using comparatively inexpensive non-precision parts.

One known type of non-venting control valve is a bladder-type valve such as the "Sur-Flo"™ control valve manufactured by Sur-Flo Meters & Controls Ltd., of Calgary, Alberta, Canada. A typical bladder-type valve of the Sur-Flo™ type has a valve core comprising a pair of frustoconical sections configured much like common pails, each having a solid base at its small-diameter end and with its large-diameter end being open, but with its conical sidewall having a plurality of perforations. The two frustoconical sections are coaxially arranged inside a generally cylindrical valve housing, with their bases in close juxtaposition. A generally cylindrical elastomer sleeve (or "bladder") is disposed within the valve housing, completely encircling the frustoconical sections, and a pressure port is provided through the cylindrical sidewall of the valve housing.

When this valve assembly is installed in a fluid flow line, and when there is no external pressure acting on the bladder through the pressure port, fluid can flow freely into the first frustoconical section and out through that section's sidewall perforations into the space between the frustoconical sections and the bladder, and then into the second frustoconical section through its sidewall perforations. However, if sufficient external fluid pressure is applied against the bladder via the pressure port (such as from a "volume bottle" or "expansion bottle" of well-known type, or from another pressure source), the bladder will contract against the frustoconical sections, sealing off their sidewall perforations, and thus preventing fluid flow through the valve assembly. At lower external fluid pressures, the bladder will restrict but not completely prevent fluid flow through the valve. Accordingly, flow through the valve can be incrementally controlled across the range between the fully-closed and fully-open position by varying the fluid pressure applied against the bladder via the pressure port, with the degree of flow restriction being roughly proportional to the external pressure acting against the bladder.

The bladder-type control valve is a comparatively simple non-venting valve that provides a wide range of flow control options under any process conditions. This valve is considerably less expensive than more complex control valves commonly in use, and it is readily serviceable by ordinarily skilled field personnel. This type of valve has proven durability and is very commonly used as a fixed-set-point back-pressure valve.

What is needed is an inexpensive adaptation of the bladder-type control valve that converts the simple fixed-set-point control valve to a variable-set-point control valve, thereby providing control of both flow and pressure. Such operational capabilities will be particularly beneficial in control valves used in conjunction with methods and apparatus for optimizing production in natural gas wells, but will be beneficial for purposes of other control valve applications as well.

BRIEF SUMMARY OF THE INVENTION

Control Logic Method and System

In general terms, the present invention teaches methods, systems and apparatus for optimizing natural gas production in response to variations in one or more selected wellbore-specific parameters. Wellsite intelligence technology is used to monitor the liquid and gas production from the wellbore under friction-loaded conditions. Wellsite technology suitable for purposes of methods and systems in accordance with the present invention may take the form of one or more programmable logic controllers (PLCs) or other suitable programmable data-processing devices. For convenience, the term PLC will be used in this patent document as a general reference to wellsite intelligence technology, with it being understood that the scope of such references is not restricted to programmable logic controllers per se.

Using baseline data gathered during production tests, the PLC determines and initiates the appropriate operating mode for the wellbore to optimize a selected production criterion (such as maximum gas production rate or maximum cash flow), to suit measured wellbore-specific parameters. The operating mode thus determined will be either a continuous clean-out mode, in which gas is continuously injected into the wellbore to prevent or minimize liquid loading, or an intermittent clean-out mode, in which liquid loading can be regulated by intermittent gas injection only. The system can be adapted to monitor wellbore performance on either a continuous or periodic basis, and to adjust the operational characteristics of the operating mode in effect at a given time, and/or to switch the operating mode, as may be dictated by variations in measured wellbore parameters.

In a first aspect, the present invention teaches a method for optimizing production from a natural gas well that is associated with a gas compressor, and which is adapted for injection of gas into a wellbore injection chamber to regulate wellbore velocity. In one embodiment, the method comprises the steps of:

conducting a plurality of baseline production tests to gather selected well productivity information under operational conditions corresponding to a selected set of test input parameters;

storing the test input parameters and the corresponding well productivity information in the memory of a programmable logic controller (PLC);

by means of the PLC, identifying the set of test input parameters that results in the optimal well productivity characteristics; and operating the well using a first set of operational parameters points corresponding to the optimal input parameters determined in the "identifying" step.

The test input parameters may comprise (but are not limited to) the compressor suction pressure and the wellbore flow rate (i.e., gas flow rate up the wellbore). The well productivity information may comprise (but is not limited to) a rate of gas production from the well, or a rate of cash flow realized from the well.

In alternative embodiments, the method of the present invention may comprise the further steps of:

conducting a plurality of supplementary production tests to gather selected well productivity information under operational conditions corresponding to a selected set of supplementary input parameters;

storing the supplementary input parameters and the corresponding supplementary well productivity information in the memory of the PLC; and by means of the PLC, determining which supplementary input parameters resulted in the most favourable supplementary well productivity information, and:

if the most favourable supplementary well productivity information represents an improvement over well productivity achieved using the first set of operational parameters, commence operating the well using the supplementary input parameters; and if the most favourable supplementary well productivity information does not represent an improvement over well productivity achieved using the first set of operational parameters, revert to operating the well using the first set of operational parameters.

In embodiments of the method, one or more control valve assemblies may be are used to regulate wellbore velocity in accordance with the operative input parameters. The one or more control valve assemblies may be of any functionally suitable design or type, including control valve assemblies in accordance with embodiments of control valve assemblies described and illustrated in the patent document. In some embodiments of the method, the PLC may be adapted to control the operation of one or more of the control valves.

In a second aspect, the present invention teaches a system for regulating multiple separate fluid flows originating from a single fluid flow source. In one embodiment, the system comprises:

an apparatus adapted to receive an inlet fluid flow, such that the apparatus diverts a first portion of the inlet fluid flow into a first downstream fluid flow, and diverts a second portion of the inlet fluid flow into a second downstream fluid flow;

a first control valve associated with the first downstream fluid flow and adapted to regulate a first flow variable relative to a first set point range, with the first flow variable being the inlet fluid flow pressure;

a second control valve associated with the second downstream fluid flow and adapted to regulate a second flow variable relative to a second set point range; and one or more additional downstream fluid flows, each having an associated control valve adapted to regulate an associated flow variable relative to an associated set point range.

In this embodiment, the first set point range is higher than the highest downstream fluid flow pressure, and the first control valve is the only valve regulating inlet fluid pressure.

It will be apparent to persons skilled in the art that the system of the invention can be readily adapted to regulate more than separate fluid flows originating from a single fluid flow source, by using additional control valves as appropriate in accordance with the concepts described herein.

In some embodiments of the system, the set point ranges for all of the control valves are wide enough to prevent valve chatter (i.e., rapid and repetitive opening and closing of a valve, typically due to the upper and lower set points being too close to each other). In some embodiments, the set point range of at least one control valve is a fixed set point range. In some embodiments, the set point range of at least one of the control valves is a variable set point range. In some embodiments, at least one control valve may have a fixed set point range, while at least one control valve has a variable set point range.

In one alternative embodiment, the system may further comprise a programmable logic controller (PLC) having a memory storing the set point range of the control valves. In this embodiment, the PLC is adapted to regulate fluid flow through the control valves by carrying out the following steps:

comparing, at selected time intervals, measured values of the flow variables regulated by the control valves against the corresponding set point ranges; and where a measured flow variable is outside its corresponding set point range and not trending toward the set point range, opening or closing the corresponding control valve as appropriate to move the value of the flow variable toward its set point range.

The PLC may be adapted to open or close the control valves in pulsed fashion, and to compare measured flow variable values at selected time intervals.

The control valves used for the system of the invention may be of any functionally suitable design or type, including control valve assemblies in accordance with embodiments of control valve assemblies described and illustrated in the patent document.

In accordance with another alternative embodiment of the system of the present invention:

the fluid flow source is a wellhead compressor associated with a natural gas well, with the gas well including a string of tubing disposed within the wellbore and defining an annulus surrounding the tubing;

the fluid is natural gas from the well;

the first downstream fluid flow is into an injection chamber selected from the tubing and the annulus, with the first downstream control valve regulating compressor discharge pressure; and the second downstream fluid flow is into a sales flow line and the second downstream control valve is regulated based on total production rate up a production chamber selected from the tubing and casing other than the injection chamber.

In one variant of this embodiment, the compressor speed can be varied. In another variant embodiment, both the compressor throughput and discharge pressure have fixed set point ranges, such that the compressor speed varies directly with suction pressure.

The system optionally may comprise a PLC having a memory that stores a selected suction pressure set point range, with the PLC being adapted to control the compressor speed and thereby to regulate suction pressure by performing the following steps:

- comparing measured values of suction pressure against the stored suction pressure set point range;
- where the measured suction pressure is outside the stored suction pressure set point range and not approaching the set point range, increasing or decreasing the compressor speed by a selected incremental amount to move the value of the suction pressure toward the stored suction pressure set point range; and
- repeating steps (a) and (b) at selected intervals until the measured suction pressure is within the stored suction pressure set point range.

The set point range of the suction pressure may be either fixed or variable.

In a third aspect, the present invention teaches a method for optimizing production from a natural gas well associated with a gas compressor, where the well includes a string of tubing disposed within the wellbore and defining an annulus surrounding the tubing, with the method including the following steps:

- providing a system for regulating multiple separate fluid flows originating from a single fluid flow source, in accordance with any embodiment previously described herein, where the system is adapted for selective diversion of the second downstream gas flow into an injection chamber selected from the tubing and the annulus;
- providing a PLC having a processor and a memory, with the PLC being programmed to control the operation of the control valves and the compressor speed, in response to input signals corresponding to selected flow variables;
- storing in the PLC memory a selected number of test data sets each containing test values for a selected set of flow variables;
- conducting a selected number of well production tests, during each of which the well operates under conditions corresponding to the flow variable values of a selected test data set, with all well production tests being of the same selected duration;
- measuring the total volume of gas produced during each production test and storing the measured gas volumes in the PLC memory with reference to their corresponding test data sets;
- determining which production test produced the highest volume of gas, and storing the corresponding test data set as the default operational parameters for the well in the PLC memory; and
- operating the well in accordance with the default operational parameters.

In variant embodiments, this method may comprise the additional steps of:

- after a selected time interval, conducting a subsequent set of well production tests in accordance with the above-described "conducting" and "measuring" steps;
- determining which subsequent production test produced the highest volume of gas, and identifying the test data set corresponding to that subsequent production test;
- if the test data set identified in the above-described "determining" step does not correspond to the default parameters stored in the PLC memory, establishing the test data set identified in the "determining" step as the new default parameters and store same in the PLC memory; and
- operating the well in accordance with the new default parameters.

In another method for optimizing production from a natural gas well associated with a gas compressor, where the well includes a string of tubing disposed within the wellbore and defining an annulus surrounding the tubing, the method includes the following steps:

- providing a system for regulating multiple separate fluid flows originating from a single fluid flow source, in accordance with any embodiment previously described herein, where the system is adapted for selective diversion of the second downstream gas flow into an injection chamber selected from the tubing and the annulus;
- providing a PLC having a processor and a memory, with the PLC being programmed to control the operation of one or more of the control valves each in response to input signals from a sensor measuring a selected flow variable;
- storing, in the PLC memory, initial set point ranges for tubing flow rate, suction pressure, and discharge pressure;
- conducting an initial well production test for a selected test duration, during which the well operates under conditions corresponding to said initial set point ranges;
- logging selected well productivity data during the initial well production test, and storing said data in the PLC memory; and
- storing the initial set point ranges in the PLC memory as the default optimum set points.

In one alternative embodiment, this method may comprise the further steps of:

- after a selected time interval, adjusting the suction pressure set point range by a selected amount, while maintaining the initial tubing rate and discharge pressure set point ranges;
- conducting a supplemental well production test for test duration corresponding to the initial test duration;
- logging the selected well productivity data during the supplemental well production test, and storing said data in the PLC memory; and
- comparing the logged well productivity data for the initial and supplemental production tests; and
- if the supplemental well productivity data is more favourable than the initial well productivity data, establishing the supplemental set point ranges as the new default parameters and storing same in the PLC memory.

In this embodiment, the adjustment to the suction pressure set point range may correspond to a suction pressure reduction, or alternatively may correspond to a suction pressure increase.

Control Valve Assemblies

In preferred embodiments, the control logic methods and systems of the present invention incorporate the use of a control valve assembly that enables the use of variable set points, in accordance with the present teachings. In one embodiment, the control valve assembly comprises:

(a) a bladder-type valve having a valve core, a valve bladder surrounding the valve core, a fluid inlet, a fluid outlet, and a pressure port;
(b) a pressure source (such as a volume bottle, in a preferred embodiment) connected to the valve's pressure port;
(c) an upstream bypass line connecting the fluid inlet and the pressure source;
(d) an upstream solenoid valve operable to regulate fluid flow through the upstream bypass line;
(e) a downstream bypass line connecting the fluid outlet and the pressure source; and
(f) a downstream solenoid valve operable to regulate fluid flow through the downstream bypass line.

Solenoid valves are well known in the art, and are commonly referred to simply as solenoids. For convenience and simplicity, the term "solenoid" will be used throughout this patent document to denote a solenoid valve.

The assembly described above allows fluid flow through the control valve at a rate Q which will be approximately proportional to the pressure differential $\Delta_P=(P_U-P_B)$, where $P_U$ is the gas pressure upstream of the valve and $P_B$ is the gas pressure acting on the bladder. In other words, if the bladder pressure $P_B$ is equal to the upstream pressure $P_U$ (i.e., $P_B=P_U$), the valve is locked closed, and flow through the valve is zero. When the bladder pressure $P_B$ is reduced to the downstream pressure $P_D$ (i.e., $P_B=P_D$), the valve is wide open, resulting in maximum flow ($Q_{MAX}$) through the valve. For bladder pressure $P_B$ between $P_U$ and $P_D$, flow through the valve will be correspondingly proportionate, relative to $Q_{MAX}$. For example, if $P_B=0.5$ $(P_U-P_D)$, the flow rate Q through the valve will be approximately 50% of $Q_{MAX}$. Similarly, for $P_B=0.35$ $(P_U-P_D)$, the flow rate Q through the valve will be approximately 35% of $Q_{MAX}$.

When the valve assembly is not in use, the upstream and downstream solenoids will be closed. As a result, the bladder pressure $P_B$ will be constant, resulting in a fixed set point for the control valve. If the upstream pressure $P_U$ increases above this set point, the valve will automatically open, allowing flow through the valve. If the upstream solenoid is held open, the upstream pressure $P_U$ and the bladder pressure $P_B$ will be in equilibrium, such that the bladder will contract against the valve core and close off fluid flow through the valve. To commence flow through the valve, the downstream solenoid is opened, and the upstream solenoid is closed, thus reducing the bladder pressure $P_B$. The fluid pressure acting against the bladder will thus be less than the upstream pressure $P_U$, so the bladder will resile away from the valve core and allow fluid flow through the valve. In preferred embodiments and preferred modes of use, fluid flow will be controlled by pulsing the downstream solenoid to increase the flow rate Q and pulsing the upstream solenoid to decrease the flow rate.

In preferred embodiments of the control valve assembly, a controller such as a programmable logic controller (PLC) is provided to control the operation of the upstream and downstream solenoids, in response to control signals from a control sensor. Depending on system requirements in specific applications, the control sensor could measure fluid pressure, fluid flow rate, fluid temperature, or other flow variables. In one embodiment, the control sensor is a motor RPM sensor, measuring the speed of a motor associated with a gas compressor. The location of a control sensor within the control valve assembly (e.g., whether it is upstream or downstream of the control valve) may vary depending on the particular flow variable being controlled, and depending on whether the variable is being sensed directly or indirectly.

In order to control a particular flow variable, a selected set point for the flow variable (for example, gas flow rate or gas pressure)—or, perhaps more typically, an allowable range between selected upper and lower values for the flow variable—is stored in the PLC's memory. If the corresponding control sensor determines that the controlled flow variable is outside the allowable range, the PLC will pulse the appropriate solenoid to bring the variable back within the allowable range.

Although described and illustrated herein with reference to bladder-type control valves (such as the "Sur-Flo"™ valve previously mentioned), control valve assemblies in accordance with the present invention are not limited or restricted to the use of those particular types of valves.

Accordingly, in a third aspect, the present invention teaches a non-venting control valve assembly, for installation in a flow line carrying a fluid (gas or liquid) under pressure, and comprising: a valve having a fluid inlet; a fluid outlet; a pressure port in fluid communication with a pressure source; and a flow restriction element exposed to the pressure source via the pressure port. The flow restriction element is adapted to fluid decrease flow through the valve in response to increases in the pressure source pressure, and to increase flow through the valve in response to decreases in the pressure source pressure.

In a first embodiment, the control valve assembly also comprises an upstream bypass line connecting the fluid inlet and the pressure source; an upstream solenoid operable to regulate fluid flow through the upstream bypass line; a downstream bypass line connecting the fluid outlet and the pressure source; and a downstream solenoid operable to regulate fluid flow through the downstream bypass line. When the pressure at the fluid inlet is greater than the pressure source pressure, opening the upstream solenoid will increase the pressure source pressure. When the pressure at the fluid outlet is less than the pressure source pressure, opening the downstream solenoid will decrease the pressure source pressure.

The control valve assembly may further comprise a programmable logic controller (PLC) adapted to control the operation of the upstream and downstream solenoids. The PLC may be adapted to control the operation of the upstream and downstream solenoids in response to data inputs from a pressure sensor associated with the fluid inlet. Alternatively or in addition, the PLC may be adapted to control the operation of the upstream and downstream solenoids in response to data inputs from a pressure sensor associated with the fluid outlet. Further, the PLC may be adapted to control the operation of the upstream and downstream solenoids in response to data inputs from a flow rate sensor associated with a fluid source upstream of the fluid inlet.

In one variant embodiment of the control valve assembly, the valve may comprise a pair of frustoconical valve core sections, each having a perforated frustoconical sidewall, a solid end wall, and an opposing open end, with the solid end walls of said sections juxtaposed. In this variant embodiment, the flow restriction element comprises a generally cylindrical and deformable bladder surrounding the valve core, such that:
  a sufficient increase in the pressure source pressure will deform the bladder into contact against the conical sidewalls of the valve core sections so as to restrict fluid flow through one or more perforations, thereby reducing the fluid flow rate through the valve;
  when the bladder is restricting fluid flow through one or more perforations, but not completely preventing fluid flow through the valve, a further increase in the pressure source pressure will further deform the bladder, thereby restricting fluid flow through one or more additional perforations, and thereby further reducing the fluid flow rate through the valve; and when the bladder is restricting fluid flow through one or more perforations, a decrease in the pressure source pressure will cause the bladder to resile away from the conical sidewalls of the valve core sections so as to allow fluid flow through one or more flow-restricted perforations, thereby increasing the fluid flow rate through the valve.

The flow restriction element of this embodiment may take the form of a bladder similar to the type used in "Sur-Flo"™ control valves, but is not limited to that particular type of flow restriction element.

In control valve assemblies in accordance with the present invention, one or both of the upstream and downstream solenoids optionally may be adapted for pulsed operation, thereby facilitating incremental adjustments to the pressure source pressure.

BRIEF DESCRIPTION OF THE DRAWINGS

Embodiments of the present invention will now be described with reference to the accompanying Figures, in which numerical references denote like parts, and in which:

FIGS. 5A and 5B are schematic diagrams illustrating parameters for determination of a wellbore's maximum liquid storage volume.

FIG. 6A is a schematic diagram of a wellbore at the beginning of the production cycle of the intermittent clean-out mode of an embodiment of a gas production optimization method of the present invention.

FIG. 6B is a schematic diagram of a wellbore as in FIG. 6A, shown at the end of the production cycle.

FIG. 7A is a schematic diagram of a wellbore at the beginning of the clean-out cycle of the intermittent clean-out mode of an embodiment of a gas production optimization method of the present invention.

FIG. 7B is a schematic diagram of a wellbore as in FIG. 7A, shown at the end of the clean-out cycle.

DETAILED DESCRIPTION OF PREFERRED EMBODIMENTS

The teachings of the present invention may be best understood after first reviewing methods and apparatus taught by the previously-mentioned U.S. Pat. No. 6,991,034 and No. 7,275,599 (the entire disclosures of which are incorporated herein by reference).

Figure 1:
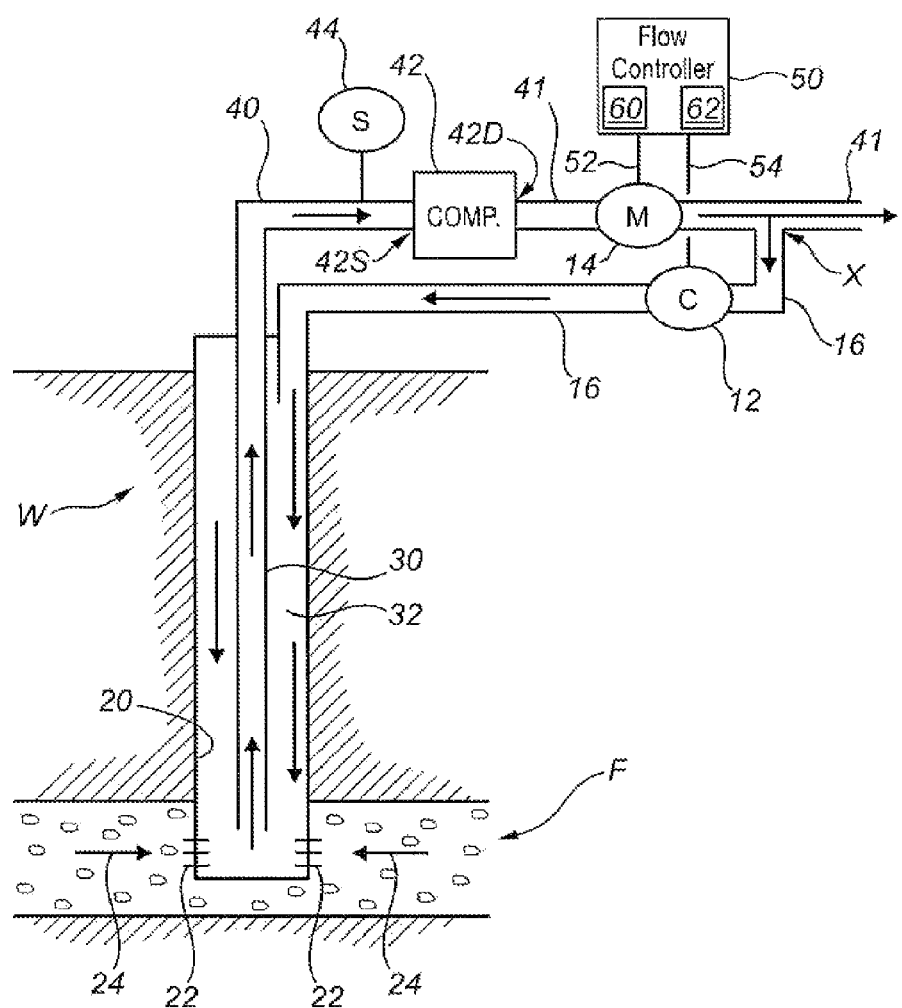
FIG. 1 is a schematic diagram of the wellhead of a natural gas well producing gas under velocity-induced flow conditions in accordance with prior art methods taught in U.S. Pat. No. 6,991,034.

FIG. 1 schematically illustrates a natural gas well W penetrating a subsurface formation F containing natural gas, with well W producing gas under velocity-induced flow conditions in accordance with one embodiment of the methods taught in U.S. Pat. No. 6,991,034. Well W is lined with a casing 20 which has a number of perforations conceptually illustrated by short lines 22 within a production zone (generally corresponding to the portion of the well penetrating the formation F). As conceptually indicated by arrows 24, formation fluids including gas, oil, and water flow into the well through perforations 22. A string of tubing 30 extends inside casing 20, terminating at a point within the production zone. The bottom end of tubing 30 is open, such that fluids entering the wellbore can freely enter tubing 30. An annulus 32 is formed between tubing 30 and casing 20. The upper end of tubing 30 runs into a surface termination apparatus or "wellhead" (not illustrated in detail), of which various types are known in the field of gas wells.

Tubing 30 and annulus 32 may be considered as separate chambers of well W. A selected one of these chambers serves as the "production chamber" through which gas is lifted from the bottom of well W to the surface, while the other chamber serves as the "injection chamber", the purpose and function of which are explained in greater detail hereinafter. For purposes of the embodiment illustrated in FIG. 1, tubing 30 serves as the production chamber, and annulus 32 serves as the injection chamber. In some alternative embodiments, tubing 30 serves as the injection chamber, and annulus 32 serves as the production chamber.

It should be noted that, to facilitate illustration and understanding of the prior art and the present invention, the Figures herein are not drawn to scale. The diameter of casing 20 is commonly in the range of 4.5 to 7 inches, and the diameter of tubing 30 is commonly in the range of 2.375 to 3.5 inches, while well W typically penetrates hundreds or thousands of feet into the ground. It should also be noted that except where indicated otherwise, the arrows in the Figures denote the direction of gas flow within various components of the apparatus.

In the well configuration shown in FIG. 1, tubing 30 serves as the production chamber to carry gas from well W to a production pipeline 40, the downstream end of which is connected to the suction manifold 42S of a gas compressor 42. The upstream end of a discharge pipeline 41 connects at one end to the discharge manifold 42D of compressor 42 and continues therefrom to a gas processing facility (not shown). A gas injection pipeline 16, for diverting production gas from production pipeline 40 for injection into the injection chamber, is connected at one end to the discharge pipeline 41 at a point X, and at its other end to the top of the injection chamber (i.e., annulus 32, in FIG. 1). Also provided is a throttling valve (or "choke") 12, which is operable to regulate the flow of gas from production pipeline 40 into the injection chamber via injection pipeline 16.

Choke 12 may be of any suitable type. In a fairly simple embodiment of the prior art apparatus of FIG. 1, choke 12 may be of a manually-actuated type, which may be manually adjusted to achieve desired rates of gas injection, using trial-and-error methods as necessary or appropriate. Alternatively, choke 12 may be an automatic choke; e.g., a Kimray® Model 2200 flow control valve. In alternative embodiments, a flow controller 50 is provided for operating choke 12. Also provided is a flow meter 14 adapted to measure the rate of total gas flow up the production chamber, and to communicate that information to flow controller 50. Flow controller 50 may be a pneumatic controller of any suitable type, such as a Fisher™ Model 4194 differential pressure controller.

Wellhead assemblies as schematically depicted in FIG. 1 will typically incorporate a gas-liquid separator (not shown) in production pipeline 40 upstream of compressor 42 for removing liquids present in the produced well fluids so that only gas flows to compressor 42.

In accordance with methods taught in U.S. Pat. No. 6,991,034, a critical gas flow rate is determined. The critical flow rate, which may be expressed in terms of either gas velocity or volumetric flow, is a parameter corresponding to the minimum velocity $V_{CR}$ that must be maintained by a gas stream flowing up the production chamber (i.e., tubing 30, in FIG. 1) in order to carry formation liquids upward within the gas stream (i.e., by velocity-induced flow). This parameter is determined in accordance with well-established methods and formulae taking into account a variety of quantifiable factors relating to the well construction and the characteristics of formation from which the well is producing. A minimum total flow rate (or "set point") is then selected, based on the calculated critical flow rate, and flow controller 50 is set accordingly. The selected set point will preferably be somewhat higher than the calculated critical rate, in order to provide a reasonable margin of safety, but also preferably not significantly higher than the critical rate, in order to minimize friction loading in the production chamber.

If the total flow rate measured by flow meter 14 is less than the set point, flow controller 50 will adjust choke 12 to increase the gas injection rate if and as necessary to increase the total flow rate to a level at or above the set point. If the total flow rate is at or above the set point, there may be no need to adjust choke 12. Flow controller 50 may be adapted such that if the total gas flow is considerably higher than the set point, flow controller 50 will adjust choke 12 to reduce the gas injection rate, thus minimizing the amount of gas being recirculated to the well through injection, and maximizing the amount of gas available for processing and sale.

In the embodiment shown in FIG. 1, flow controller 50 has a computer with a microprocessor 60 and a memory 62. Flow controller 50 also has a meter communication link 52 for receiving gas flow measurement data from flow meter 14. Meter communication link 52 may comprise a wired or wireless electronic link, and may comprise a transducer. Flow controller 50 also has a choke control link 54, for communicating a control signal from computer 60 to a choke control means (not shown) which actuates choke 12 in accordance with the control signal from computer 60. Choke control link 54 may comprise a mechanical linkage, and may comprise either a wired or wireless electronic link.

In operating the prior art apparatus of FIG. 1, the set point is stored in memory 62. Computer 60 receives a signal from flow meter 14 (via meter communication link 52) corresponding to the measured total gas flow rate in the production chamber, and, using software programmed into Computer 60, compares this value against the set point. Computer 60 then calculates a minimum injection rate at which supplementary gas must be injected into the injection chamber, or to which the injection rate must be increased in order to keep the total flow rate at or above the set point. This calculation takes into account the current gas injection rate (which would be zero if no gas is being injected at the time). If the measured total gas flow is below the set point, computer 60 will convey a control signal, via choke control link 54, to the choke control means, which in turn will adjust choke 12 to deliver injection gas, at the calculated minimum injection rate, into injection pipeline 16, and thence into the injection chamber of the well (i.e., annulus 32, in FIG. 1). If the measured total gas flow equals or exceeds the set point, no adjustment of choke 12 will be necessary, strictly speaking.

Figure 2:
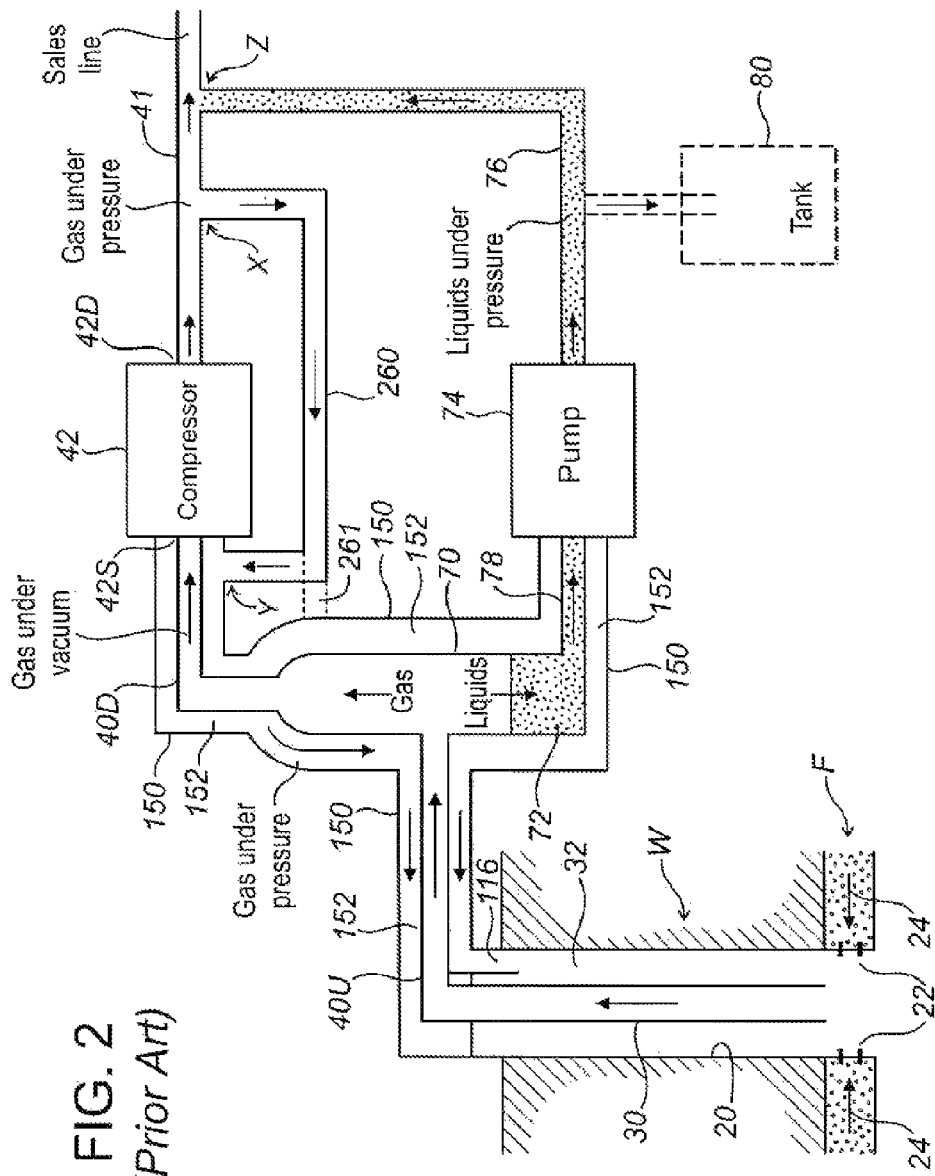
FIG. 2 is a schematic diagram of the wellhead of a natural gas well producing gas under velocity-induced flow conditions and enclosed within a positive pressure gas jacket in accordance with prior art methods taught in U.S. Pat. No. 7,275,599.

FIG. 2 conceptually illustrates a gas-blanketed natural gas wellhead in accordance with one embodiment of prior art apparatus taught by U.S. Pat. No. 7,275,599, and adapted to provide for gas injection into an injection chamber generally as in the apparatus of FIG. 1. The apparatus shown in FIG. 2 has numerous components that correspond to components of the apparatus of FIG. 1 (with like numerical references). Although not shown, the apparatus of FIG. 2 may incorporate a flow controller 50, choke 12, and associated components as in the apparatus of FIG. 1.

In the apparatus of FIG. 2, production pipeline 40 is divided into an upstream section 40U that conveys produced well fluids under negative pressure from well W's production chamber (i.e., tubing 30 in FIG. 2) to a gas-liquid separator 70, and a downstream section 40D extending between separator 70 and suction manifold 42S of compressor 42. Similar to the apparatus of FIG. 1, a discharge pipeline 41 connects to discharge manifold 42D of compressor 42 and continues therefrom to a gas processing facility (not shown). As schematically indicated, well fluids entering separator 70 separate into a gas fraction that exits separator 70 through downstream section 40D of production pipeline 40 to compressor 42, and a liquids fraction 72 which, being heavier than the gas fraction of the well fluids, accumulates in a lower section of separator 70. Liquids 72 flow under negative pressure through a pump inlet line 78 to a pump 74, which pumps liquids 72 (now under positive pressure) through a liquid return line 76 which connects into discharge pipeline 41 at a point Z downstream of compressor 42. Alternatively, liquids 72 may be pumped to an on-site storage tank 80.

As illustrated in FIG. 2, upstream section 40U and downstream section 40D of production pipeline 40, separator 70, and pump inlet line 78 are fully enclosed by a vapour-tight positive pressure jacket 150 that defines a continuous internal chamber 152. A gas recirculation pipeline 260 extends between, and is in fluid communication with, discharge pipeline 41 at point X located between compressor 42 and point Z, and a selected pressure connection point Y on positive pressure jacket 150, such as between compressor 42 and separator 70 as shown in FIG. 2. By means of recirculation pipeline 260, a portion of the gas discharged from discharge manifold 42D of compressor 42 (at positive pressure) may be diverted into positive pressure jacket 150, such that upstream section 40U and downstream section 40D of production pipeline 40, separator 70, and pump inlet line 78 are entirely enclosed by a "blanket" of gas under positive pressure. Positive pressure jacket 150 thus enshrouds all components that contain containing combustible fluids under negative pressure with a blanket of gas under positive pressure, thereby preventing the entry of air in the event of a leak developing in any component containing combustible fluids under negative pressure. Blanketing gas may be diverted from internal chamber 152 for injection into a selected injection chamber of well W via a suitable injection pipeline represented by reference numeral 116 in FIG. 2, for producing well W under velocity-induced flow conditions as previously described in connection with FIG. 1. Alternatively, injection gas can be introduced into the injection chamber via a separate injection pipeline (not shown) connected into gas recirculation pipeline 260.

Optimization of Production

Figure 3:
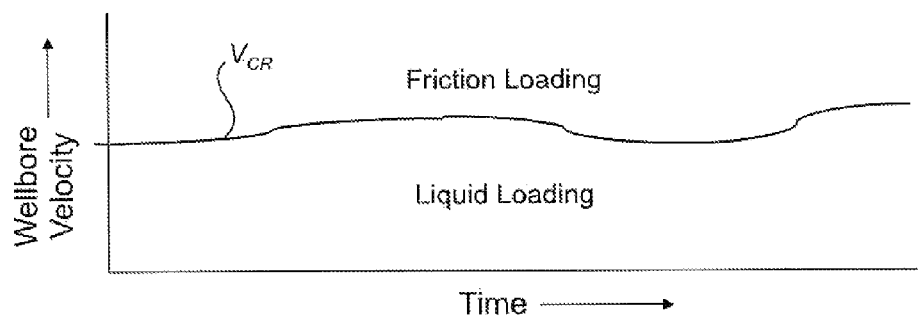
FIG. 3 is a graph of wellbore velocity versus time, schematically illustrating the variable critical fluid flow velocity above which a gas well will be friction loaded and below which a gas well will be liquid loaded.

FIG. 3 conceptually illustrates the previously-discussed principle that production optimization for a gas well requiring continuous removal of liquids can be achieved by keeping the upward fluid velocity in the production chamber as close as practically possible to the well's critical velocity, in order to prevent accumulation of liquids while minimizing friction loading. In FIG. 3 the line marked $V_{CR}$ (which may be referred to as the critical velocity curve) indicates the critical upward velocity for well fluids flowing up the production chamber of a gas well, at or above which liquid droplets will be lifted along with the gaseous portion of the well fluids; in other words, the velocity at or above which the well will be producing gas under velocity-induced flow conditions.

As conceptually illustrated in FIG. 3, and as noted earlier, the value of critical velocity $V_{CR}$ for a given wellbore is dependent upon a number of factors that are subject to change over the production life of the wellbore (such as flow line pressure, reservoir pressure, liquid production rate, liquid composition, gas composition, and wellbore design). Whenever the actual upward flow velocity in the production chamber (also referred to herein as the wellbore velocity $V_{WB}$) is higher than the current value of $V_{CR}$ (i.e., above the critical velocity curve in FIG. 3), the well will be producing under velocity-induced flow conditions. The higher the wellbore velocity is relative to $V_{CR}$, the greater the extent to which the wellbore will be subject to friction loading. Whenever the wellbore velocity is lower than the current value of $V_{CR}$ (i.e., below the critical velocity curve), the well will be prone to liquid loading.

Figure 4:
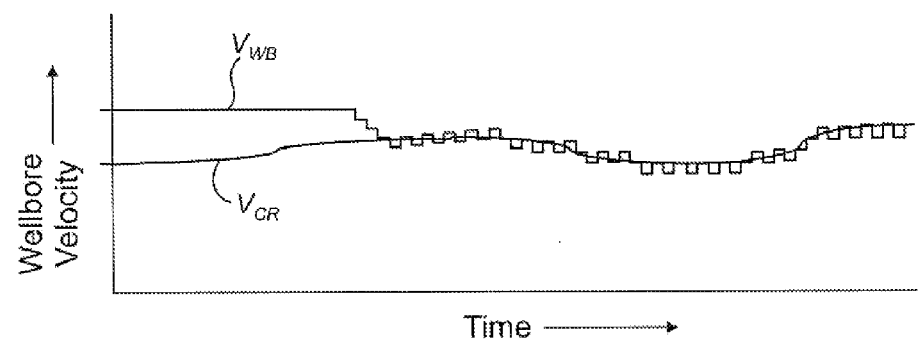
FIG. 4 is a graph of wellbore velocity versus time, schematically illustrating optimization of wellbore velocity, with the well operating in a continuous clean-out mode in accordance with an embodiment of a gas production optimization method of the present invention.

FIG. 4 schematically illustrates how wellbore velocity $V_{WB}$ may be optimized using methods and systems in accordance with the present invention; i.e., to induce a wellbore that maintains velocity-induced flow to minimize or prevent liquid loading, while also minimizing friction loading. Because wellbore-specific parameters vary over time, thus changing the wellbore's critical velocity, the system automatically makes upward or downward adjustments to the wellbore velocity $V_{WB}$ to keep it just sufficient to prevent liquid loading—in other words, effectively matching the flow rate to the critical velocity. This optimized production state is graphically illustrated in FIG. 4, in which the solid curve represents the critical velocity $V_{CR}$, and the stepped line indicates the actual wellbore velocity $V_{WB}$ as periodically adjusted in accordance with methods of the present invention.

As may be generally understood from FIG. 4, production from the well in accordance with methods of the present invention may be commenced in a friction-loaded state—i.e., at an initial wellbore velocity $V_{WB}$ having a value above the critical velocity curve in FIG. 3. The initial value for wellbore velocity $V_{WB}$ may be determined on a trial-and-error basis, or on the basis of a theoretical prediction of critical velocity $V_{CR}$, but in either case erring on the high side to protect against starting production with the well in a liquid-loaded state.

At specified intervals, the system's PLC (or other suitable wellsite intelligence technology) gathers selected production data for the wellbore, such as liquid flow rates, gas flow rates, tubing pressure, and casing pressure, by means of suitable sensing or metering devices (which will be familiar to persons skilled in the art). The PLC is programmed to process this collected data to determine whether the wellbore velocity $V_{WB}$ needs to be increased or decreased to keep it close to the critical velocity $V_{CR}$ and thus prevent accumulation of liquids. This is accomplished without needing to quantify the critical velocity $V_{CR}$, as the system determines the need to adjust wellbore velocity based on actual, real-time wellbore operational conditions. Any necessary adjustments to wellbore velocity will be automatically initiated by the PLC, which regulates the operation of gas flow control valves as described in detail later in this specification.

Intermittent Clean-Out Mode

The PLC can also be programmed to run additional production tests at specified intervals to determine whether the wellbore can be optimally produced with intermittent clean-out of liquids rather than on a continuous clean-out basis.

Wells accumulating (or "making") large quantities of water can load up within minutes of wellbore velocities falling below the critical velocity $V_{CR}$. For such wells, liquid loading can be alleviated or prevented by maintaining a wellbore velocity $V_{WB}$ at or above a critical velocity, as conceptually illustrated in FIG. 4. This production mode may be referred to as the continuous clean-out mode, in which all liquids are removed from the wellbore on a continuous basis.

In contrast, wells making comparatively low quantities of water can take days to load up (i.e., to become liquid loaded) after wellbore velocities have fallen below the critical velocity $V_{CR}$. For such wells, it may be optimally efficient to produce at wellbore velocities below $V_{CR}$, thus permitting a certain amount of liquid loading but not enough to kill the well, and removing accumulated liquids on an intermittent basis. This production mode may be referred to as the intermittent clean-out mode, in which the wellbore velocity $V_{WB}$, although lower than the wellbore's critical velocity $V_{CR}$, is sufficient to produce gas from the wellbore but will necessarily permit the accumulation and storage of liquids in the wellbore while gas is being produced.

In intermittent clean-out mode, particularly in wellbores that make minimal quantities of water, it will generally be desirable to produce at a wellbore velocity $V_{WB}$ that is as low as possible to minimize friction loading. This may be done by producing up the production chamber that has the larger cross-sectional area, resulting in a lower wellbore velocity $V_{WB}$ for a given volumetric production rate. In typical wellbores, this will mean producing up annulus 32 rather than up tubing 30.

FIGS. 5A and 5B schematically illustrate the parameters for determining the maximum volume of liquids that can accumulate in a wellbore without killing the wellbore. This maximum liquid storage volume, or $LSV_{MAX}$, for a given wellbore may be defined as the maximum volume of liquid that can be stored in the wellbore and removed up the production chamber (typically tubing 30) by means of gas injection into the injection chamber (typically annulus 32). When $LSV_{MAX}$ is stored in tubing 30 and annulus 32 as illustrated in FIG. 5A, with no differential pressure between tubing 30 and annulus 32, $LSV_{MAX}$ will come to a static height $H_1$ above the bottom of the wellbore. As will be appreciated from FIG. 5A, static height $H_1$ must not rise above perforations 22 in casing 20, in order to prevent the well from being killed. Accordingly, the static height $H_1$ of $LSV_{MAX}$ will be one variable in the determination of $LSV_{MAX}$.

The value of $LSV_{MAX}$ will also be dependent upon the capacity of the particular compressor 42 associated with the wellbore. Stated another way, the hydrostatic pressure that would be produced when $LSV_{MAX}$ is completely contained within tubing 30 must be less than the pressure that compressor 42 is capable of inducing by means of gas injection into annulus 32. This maximum hydrostatic pressure will be equal to the vertical liquid height $H_2$ of $LSV_{MAX}$ if wholly contained within tubing 30 (as illustrated in FIG. 5B) multiplied by the specific gravity of the liquid.

An additional limiting factor with respect to the maximum liquid storage volume $LSV_{MAX}$ will be the reservoir pressure. If the hydrostatic pressure of $LSV_{MAX}$ is greater than the reservoir pressure, it will be impossible to clean out the accumulated liquids because the injection gas will simply flow into the subsurface formation rather than lifting the liquids. Therefore, the hydrostatic pressure of $LSV_{MAX}$ must not be greater than the lesser of the reservoir pressure and the compressor capacity.

Accordingly, the value of $LSV_{MAX}$ will vary from well to well, depending upon wellbore dimensions, perforation height, compressor capacity, and reservoir pressure. In typical installations, the compressor will be capable of raising a column of liquid in tubing 30 under a hydrostatic head of about 700 kiloPascals. However, the value of $LSV_{MAX}$ for a particular well will typically be determined by calculation.

The intermittent clean-out mode is characterized by the alternating production and clean-out cycles, as follows:

Production Cycle:
As schematically illustrated in FIGS. 6A and 6B, during the production cycle the well produces up the largest available production chamber (typically annulus 32), to minimize friction loading. Due to the resultant low fluid velocities, however, liquids are not removed and gradually accumulate in the wellbore. Provided that the wellbore is configured with tubing 30 submerged below perforations 22 in casing 20, as shown in FIG. 6B, the accumulated liquids will provide no loading on the producing formation F. When the well's maximum liquid storage volume $LSV_{MAX}$ has accumulated in the wellbore, the production cycle ends and the clean-out cycle begins.

Clean-Out Cycle:
During the clean-out cycle the well produces up the tubing 30, as schematically illustrated in FIGS. 7A and 7B. The wellbore velocity will be above the wellbore critical velocity due to gas injection into the annulus 32, resulting in all accumulated liquids being removed. When liquids production ceases, the clean-out cycle will end, and a new production cycle will start.

The methods and systems of the present invention provide for testing a well to assess whether optimal productivity will be realized operating in intermittent clean-out mode rather than continuous clean-out mode. This may be referred to as the "mode test" phase. After calculating the production cycle time (as described in detail later herein), the PLC will cause the well to produce in intermittent clean-out mode for a predetermined time (for example, one week). Once this time has elapsed, the PLC will automatically change modes and produce in the continuous clean-out mode for the same predetermined time period. Upon completion of the "mode test" phase, the PLC will default into the mode that produced more gas during the test period (or that produced the greater cash flow, depending on the selected optimization criteria).

In order to easily and efficiently switch between production chambers in a gas-blanketed wellbore (as described in U.S. Pat. No. 7,275,599), a downhole packer 26 with an integral three-way valve 28 (of any suitable type) may be used. The operation of such a three-way valve is schematically illustrated in FIGS. 6A, 6B, 7A, and 7B. During the production cycle of the intermittent clean-out mode as shown in FIGS. 6A and 6B, gas is produced up annulus 32 as well as up tubing 30, with three-way valve 28 being set in a first position that allows gas to flow out of annulus 32 and into tubing 30 at an upper region thereof. During the clean-out cycle as shown in FIGS. 7A and 7B, three-way valve 28 is set in a second position that allows supplementary or "recycle" gas to be injected into annulus 32 to remove accumulated liquids.

Monitoring real-time liquids production rates and suction pressures will determine the trigger point for ending the clean-out cycle, as well as providing a benchmark gas-to-liquid ratio for use in determining the duration of the production cycle. For operations in which the wellbore is not gas-blanketed, no downhole packer is required. In such cases, the three-way control valve does not need to be located downhole, and could be located at the surface.

In accordance with one embodiment of the method of the present invention, production from a gas well is commenced in a friction-loaded state—i.e., at a production fluid velocity above the critical velocity curve in FIG. 3. This state may be initiated on a trial-and-error basis, or based on a theoretical prediction of the critical velocity but erring on the high side to protect against a liquid-loaded state. The PLC (or other suitable wellsite intelligence technologies) is used to gather production data for the wellbore, including liquid flow rates, gas flow rates, tubing pressure, and casing pressure; this production data is collected at regular intervals.

During this production testing, the following data are captured or determined for each blowcase cycle (i.e., each time accumulated liquids are removed from the blowcase of separator 70):

1. time since the last blowcase cycle (minutes);
2. liquid volume dumped during the current blowcase cycle (litres);
3. gas volume produced since the last blowcase cycle (in cubic meters$\times 10^3$);
4. water-to-gas ratio (WGR) for the current blowcase cycle, in liters of water per $10^3$ cubic meters of gas (calculated using values from items 2 and 3 above); and
5. casing (i.e., annulus) pressure at the start of the current blowcase cycle.

Utilizing the calculated WGR and maximum liquid storage volume $LSV_{MAX}$ for the wellbore, and while the wellbore is operating in the intermittent clean-out mode, the system's PLC calculates the duration of the next production cycle (i.e., how long it will take for $LSV_{MAX}$ to accumulate in the wellbore). This value is determined in accordance with the following formula:

$$\text{Production Cycle Time} = LSV_{MAX}/(WGR \times Q_{AV})$$

where $Q_{AV}$ is the average volumetric gas flow rate.

After production from the well is stabilized in a friction-loaded state, the wellbore velocity $V_{WB}$ is gradually reduced in order to effectively eliminate friction loading. The PLC does this by initiating incremental changes to $V_{WB}$ at predetermined time intervals, while continually comparing real-time wellbore data against the baseline data in order to detect the onset of liquid loading as $V_{WB}$ is reduced. Imminent liquid loading will typically be indicated by an upward trend in casing pressure and a downward trend in liquid production rates. Other "flags" may also be used to identify the beginning or approach of a liquid-loaded state. Upon sensing the onset of liquid loading, the optimization system of the present invention automatically increases the rate of gas injection to raise the wellbore velocity $V_{WB}$ by an increment sufficient to return the wellbore to a marginally friction-loaded state.

Because wellbore-specific parameters vary over time, thus changing the wellbore's critical velocity, the system automatically makes upward or downward adjustments to the wellbore velocity $V_{WB}$ to keep it just sufficient to prevent liquid loading—in other words, effectively matching the flow rate to the changing critical velocity, based on real-time wellbore data. This optimized production state is graphically illustrated in FIG. 4, in which the solid curve represents the critical velocity, and the stepped line indicates the actual gas flow rate as periodically adjusted in accordance with the present invention.

Critical Velocity Determination

In accordance with the method and system of the present invention, the critical velocity for a producing gas well is automatically determined, and the set point (i.e., upward fluid velocity in the production tubing) is automatically adjusted as may be necessary from time to time in response to changes in the critical velocity, thereby maintaining a set point substantially equal to the critical velocity, thus preventing liquid loading and minimizing friction loading in the wellbore.

Using the stabilized WGR and average gas production rate, the PLC can calculate an estimated time until the next blowcase dump cycle, in accordance with the following formula:

Time until next dump=Time of last dump−[Volume per cycle/(WGR×$Q_{AV}$)]

When the wellbore velocity $V_{WB}$ falls below the critical velocity $V_{CR}$, liquids will accumulate in the wellbore, resulting in an increase in the time between blowcase dumps. This increase in time between dumps will serve as the primary flag for indicating the onset of liquid loading.

A secondary flag for liquid loading will be an upward trend in the pressure in annulus 32. This is a proven method of identifying wellbore loading commonly used in most wellsite optimization systems currently available.

Other "flags" may also be used to help identify the beginning or approach of a liquid-loaded state. Upon sensing the onset of liquid loading, the optimization system of the present invention automatically increases the gas flow rate in the production tubing by an increment sufficient to return the wellbore to a marginally friction-loaded state.

Gas Flow Regulation

Figure 8:
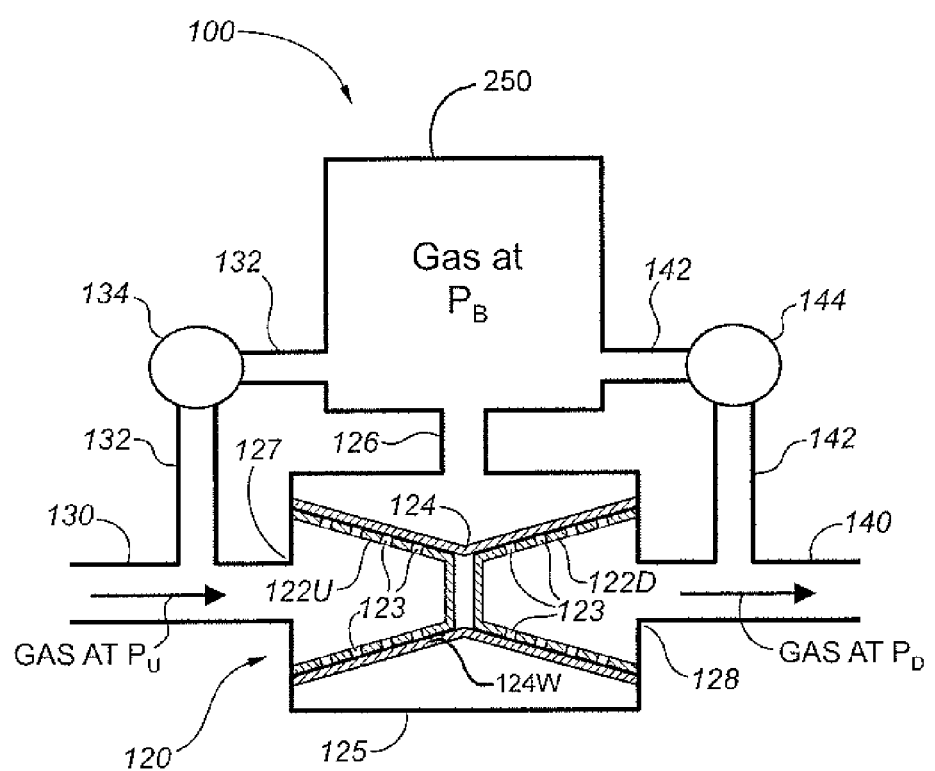
FIG. 8 is a schematic diagram of a first embodiment of a bladder-type control valve assembly in accordance with the present invention.

Optimization of gas production in accordance with the methods described above necessarily entails the use of flow control devices such as control valves to regulate the rate of gas injection into the well. FIG. 8 schematically illustrates a basic embodiment of a control valve assembly 100 in accordance with the present invention, and in the specific context of a natural gas flow line. In the embodiment of FIG. 8, the control valve assembly 100 includes a bladder-type control valve 120 a valve core 122 disposed within a valve housing 125, with valve housing 125 having an intake port 127, an outlet port 128, and a pressure port 126. Valve core 122 comprises an upstream frustoconical section 122U and a downstream frustoconical section 122D, each having a solid base at its small-diameter end and with its large-diameter end being open, but with its conical sidewall having a plurality of perforations 123. The two frustoconical sections 122U and 122D are coaxially arranged inside a generally cylindrical valve housing, with their bases in close juxtaposition. A generally cylindrical bladder 124, made from of a resilient, deformable material, and defining a bladder wall 124W, is disposed around surrounding valve core sections 122U and 122D. In FIG. 8, bladder 124 is shown contracted against the conical sidewalls of frustoconical sections 122U and 122D, in response to differential pressure acting on bladder 124, thereby blocking flow through perforations 123, such that gas entering upstream valve core section 122U cannot flow into downstream valve core section 122D.

Control valve assembly 100 of FIG. 8 further comprises a fluid inlet line 130 in fluid communication with intake port 127; a fluid outlet line 140 in fluid communication with outlet port 128; and a pressure port 126. A pressure source 250 (such as a volume bottle, in a preferred embodiment) is connected to pressure port 126. An upstream bypass line 132 connects fluid inlet line 130 to pressure source 250, with an associated upstream solenoid 134 operable to regulate fluid flow through upstream bypass line 132. A downstream bypass line 142 connects fluid outlet line 140 to pressure source 250, with an associated downstream solenoid 144 operable to regulate fluid flow through downstream bypass line 142.

In FIG. 8, $P_U$ denotes gas pressure upstream of control valve 120, $P_B$ denotes gas pressure acting on bladder wall 124W of bladder 124 of control valve 120, and $P_D$ denotes gas pressure downstream of the control valve. Any time the system is not running, upstream solenoid 134 will be open and downstream solenoid 144 will be closed, such that $P_U$ will be equal to $P_B$, and control valve 120 will therefore be closed as shown in FIG. 8, with bladder 124 blocking flow through perforations 123 in valve core sections 122U and 122D. After the system had been started, upstream solenoid 134 remains open, thus ensuring no gas is lost until it is desired to commence flow through valve 120.

Pulsing downstream solenoid 144 open causes $P_U$ to exceed $P_B$, thus initiating a flow of gas through control valve 120. The first time downstream solenoid 144 is pulsed to initiate flow, upstream solenoid 134 is automatically closed. After this point both upstream solenoid 134 and downstream solenoid 144 remain closed unless they are pulsed open. Pulsing downstream solenoid 144 open will increase the gas flow rate, whereas pulsing upstream solenoid 134 open will decrease the flow rate. If the valve assembly goes down for any reason, upstream solenoid 134 will automatically open, restoring pressure equilibrium (i.e., $P_U = P_B$), such that gas flow through control valve 120 is shut off.

Figure 9:
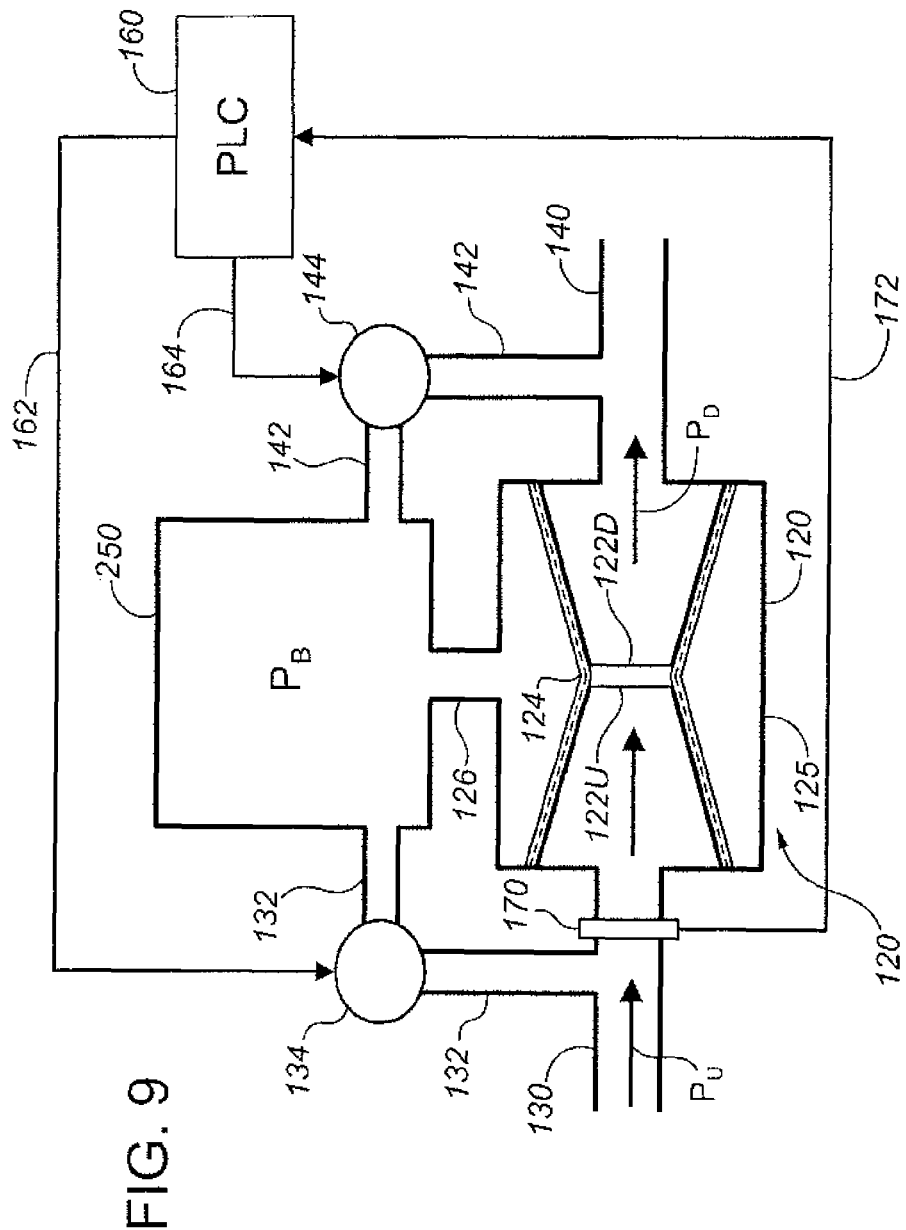
FIG. 9 is a schematic diagram of a second embodiment of a bladder-type control valve assembly in accordance with the present invention.

FIG. 9 illustrates an embodiment of the flow control valve assembly using a PLC 160 in conjunction with a pressure sensor 170 installed upstream of control valve 120, with PLC 160 being in electronic communication with pressure sensor 170 via a pressure sensor link 172. In addition, PLC 160 is in electronic communication with upstream solenoid 134 and downstream solenoid 144, via upstream and downstream solenoid links 162 and 164 respectively, for controlling the operation of solenoids 134 and 144.

For purposes of flow control, this embodiment of control valve 120 may be operated by the following steps, as controlled by PLC 160:

1. Close control valve 120 by energizing upstream solenoid 134 to equalize upstream pressure $P_U$ and bladder pressure $P_B$. This provides a known starting point for the logic process and ensures a safe start-up. Any time upstream solenoid 134 is open for an extended duration, control valve 120 is closed.
2. Open control valve 120 by pulsing downstream solenoid 144 open, such that $P_B$ drops below $P_U$ due to the flow of gas from volume bottle 250 through downstream solenoid 144. This results in a pressure differential across bladder 124, urging bladder 124 radially outward from valve core sections 122U and 122D and thereby allowing gas to flow through perforations 123. When downstream solenoid 144 is initially pulsed, upstream solenoid 134 is automatically de-energized. After this point, upstream solenoid 134 and downstream solenoid 144 both remain closed unless they are pulsed open.

3. Normal operation of control valve 120 in flow control mode: After each pulse of a solenoid, PLC 160 compares the actual volumetric gas flow rate (based on data received from a suitable flow meter, not shown in FIG. 9) to a desired operational envelope (i.e., a specified range of acceptable flow rates) stored in the memory of PLC 160, whereupon:

If the flow rate is below the desired envelope, downstream solenoid 144 is pulsed, thus increasing the flow rate.

If the flow rate is above the desired envelope, upstream solenoid 134 is pulsed, thus decreasing the flow rate.

If the flow rate is within the desired envelope, neither solenoid is pulsed.

For purposes of pressure control, the system illustrated in FIG. 9 may be operated by the following steps:

1. Both upstream solenoid 134 and downstream solenoid 144 are closed, thus locking in a specified bladder pressure $P_B$.

2. Normal operation of control valve 120 in pressure control mode: After each pulse of one of the solenoids, PLC 160 compares the actual pressure (as sensed by pressure sensor 170) to a desired operational envelope (i.e., a specified range of acceptable flow pressures), whereupon:

If the pressure is below the desired envelope, upstream solenoid 134 is pulsed, thus increasing bladder pressure $P_B$.

If the pressure is above the desired envelope, downstream solenoid 144 is pulsed, thus decreasing bladder pressure $P_B$.

If the pressure is within the desired envelope, neither solenoid is pulsed.

Control valve arrangements in accordance with the present invention offer a number of significant advantages over known technologies, including the following:

The system is entirely vent-free, thus eliminating all emissions of gas (e.g., methane) to atmosphere, and allowing all gas to be sent to sales;

The system eliminates methane concentrations in separator/compressor buildings, thus providing a safer working environment;

Purchase costs for the system are considerably lower than alternative control valve assembly currently available;

The control valve can accommodate a certain amount of solid matter;

Valve noise is eliminated under all process conditions;

Two control valves can work efficiently in the same fluid system. Valve chatter is eliminated due to gentle valve response; and Maintenance costs are lower than for known alternative control valve arrangements, as the comparatively simple design allows the control valve to be easily serviced by most operators.

Figure 10:
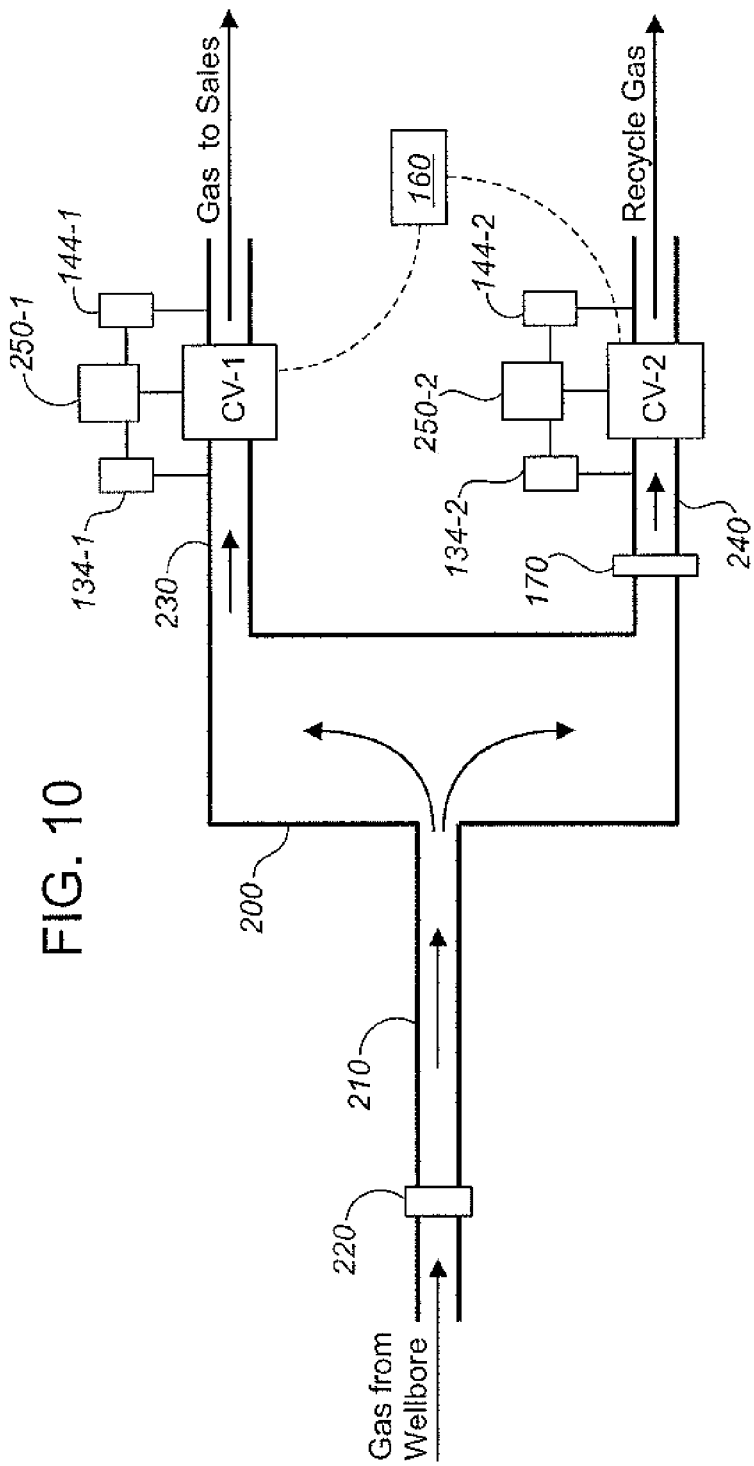
FIG. 10 schematically illustrates the use of bladder-type control valves in accordance with the present invention, to regulate the flow of sales gas and injection gas in conjunction with embodiments of the method of the present invention.

The block diagram of FIG. 10 schematically illustrates how bladder-type control valves as taught herein may be used to regulate two or more separate gas flows originating from a single fluid flow source. This is illustrated in FIG. 10, by way of non-limiting example, in the specific context of a first flow of gas from a well to a processing and sales facility, and a second flow of gas intended for injection into a selected injection chamber of the well for purposes of producing or maintaining velocity-induced flow conditions as previously described herein.

In FIG. 10, process block 200 conceptually represents wellhead apparatus comprising a compressor and other components (typically including a separator) as may be required for a given gas well. A gas supply flowline 210 (analogous to production pipeline 40 in FIG. 1 or upstream production pipeline 40U in FIG. 2) conveys produced fluids from the well to wellhead apparatus 200. A volumetric flow meter 220 is provided in association with supply flowline 210. Wellhead apparatus 200 processes the well fluids to produce a first flow of gas into a sales gas pipeline 230 downstream of the compressor and a second flow of gas into an injection pipeline 240 (analogous to injection pipeline 16 in FIG. 1 or injection pipeline 260 in FIG. 2).

A first control valve CV-1, provided in association with sales gas pipeline 230, is generally in accordance with the embodiment shown in FIG. 8, with an upstream solenoid 134-1, a downstream solenoid 144-1, and a volume bottle (or other pressure source) 250-1. First control valve CV-1 is in electronic communication with a PLC 160 for regulating the operation of upstream and downstream solenoids 134-1 and 144-1 as previously described in connection with FIG. 9. PLC 160 is also in electronic communication with flow meter 220. Accordingly, first control valve CV-1 is configured to control the volumetric flow rate in supply flowline 210 by regulating the flow of gas in sales pipeline 230.

A similar second control valve CV-2 is provided in association with injection pipeline 240, and has an upstream solenoid 134-2, a downstream solenoid 144-2, and a volume bottle 250-2, plus a pressure sensor 170 as in the embodiment of FIG. 9. Second control valve CV-2 is in also electronic communication with PLC 160 (or, in alternative embodiments, with a separate PLC) for regulating the operation of upstream and downstream solenoids 134-2 and 144-2. As in the embodiment of FIG. 9, PLC 160 is also in electronic communication with pressure sensor 170. Accordingly, second control valve CV-2 is configured to control pressure.

As indicated above, first control valve CV-1 controls the flow rate in supply flowline 210. First control valve CV-1 slowly begins to close if the tubing rate is below a selected lower tubing rate set point (or LTRSP) stored in PLC 160's memory. As first control valve CV-1 closes, more gas is recycled to the well's selected injection chamber via injection pipeline 240, thereby causing the tubing flow rate to increase. First control valve CV-1 slowly begins to open if the tubing rate is above a selected upper tubing rate set point (or UTRSP) stored in PLC 160's memory. As first control valve CV-1 opens, less gas is recycled to the injection chamber, thus causing the tubing rate to decrease. First control valve CV-1 will have no action if the tubing rate is in the operational envelope between the UTRSP and the LTRSP.

As indicated previously, second control valve CV-2 controls upstream gas pressure. Although second control valve CV-2 is illustrated as having an upstream solenoid 134-2 and a downstream solenoid 144-2, in alternative embodiments second control valve CV-2 can have a fixed set point with no solenoids. In that scenario, the set point will need to be set above the peak flow line pressure typically seen during normal operation. This will allow first control valve CV-1 to direct gas either to sales or recycle. If first control valve CV-2 has a fixed set point below the flowline pressure it will be impossible to send gas to sales.

For ultimate efficiency, however, second control valve CV-2 can incorporate solenoids as shown in FIG. 10, to provide a variable pressure set point. In this scenario, the set point will be automatically be maintained at a fixed amount above the flowline pressure. As the flowline pressure changes, so will second control valve CV-2's set point.

Comprehensive field trials using fixed-velocity gas production systems as taught in U.S. Pat. No. 6,991,034 have demonstrated that a given wellbore will not necessarily load up with liquids and die if the LTRSP is significantly below the wellbore's critical rate (i.e., critical velocity $V_{CR}$). FIG. 3 illustrates how the critical rate is the point at which both friction loading and liquid loading are minimized. As a result, any time a wellbore is produced exactly at the critical rate, the wellbore is achieving maximum drawdown and achieving maximum gas production.

The second part of the optimization process is to determine the speed (measured in RPM) at which the compressor should run. The design of any compressor will dictate that at any given throughput and discharge pressure there will be a corresponding suction pressure. The tubing rate set point (or TRSP) defines the throughput and the flowline pressure defines the discharge pressure, so compressor speed will be directly related to suction pressure. By establishing a desired operational suction pressure set point, the production optimization system of the present invention will gradually speed up the compressor until this suction pressure set point is met (provided that the compressor motor is not overloaded).

Various energy saving routines can be added to reduce power consumption. For example, the system can identify when the gas processing plant goes down and the system is in full recycle (i.e., with no gas going to sales). As well, the compressor speed can be reduced to minimize wasted power. It is also a good idea to protect the system by establishing a maximum compressor speed. This would be an RPM set point slightly above the typical operating RPM.

In accordance with production optimization methods of the present invention, a fixed-velocity system will have the ability to maintain the tubing gas rate within pre-set upper and lower tubing rate set points (UTRSP and LTRSP). However, if the UTRSP is too high, excessive gas flow velocity in the wellbore's production chamber will restrict production due to friction loading. If the LTRSP is too low, liquid build-up in the wellbore will restrict production due to liquid loading. In this scenario, the wellbore's production will become very unstable, intermittently loading up and then unloading itself.

Comprehensive field trials using our fixed-velocity system have confirmed that a wellbore will not load up and die if the LTRSP is significantly below the critical rate for the subject wellbore. The RPM controls automatically adjust the compressor speed to bring the suction pressure to the set point. Reduced suction pressure will increase tubing velocities, removing liquids from the wellbore but causing increased friction loading.

Optimum Set Point

A further aspect of the production optimization methods of the present invention is the ability to automatically determine the tubing flow rate and the corresponding suction pressure that will result in optimal production from a given wellbore. This optimal combination of tubing rate and suction pressure may be referred to as the optimum set point (or OSP).

A wellbore's OSP can be defined in different ways, depending on selected criteria. The OSP would most commonly be defined to maximize gas production—which in most conditions will correspond to maximum cash flow from the wellbore. In some situations, however, maximum production might not equate to maximum cash flow. For example, power consumption and water production might not be directly proportional to the gas production rate, such that the incremental power cost to increase well production could be more than the incremental value of gas produced. In a different scenario, the water-to-gas ratio (WGR) in a producing gas well might increase disproportionately with increased gas production rates, thus making it advantageous to produce the well at lower rates. Accordingly, it may be desirable for some wellbores to define the OSP to maximize cash flow rather than to maximize production, and the criteria for establishing the OSP might vary over the life of the wellbore. It is also possible that the OSP for some wellbores would be based on criteria other than production or cash flow.

Implementation of optimization methods in accordance with the invention may be facilitated by creating a production test grid for the wellbore, by conducting a series of baseline production tests using selected values for key operational parameters. Table 1 below illustrates a sample production test grid which may be maintained in the PLC memory to record input data and well performance data for each production test:

TABLE 1

| Tubing Flow Rate set point ($m^3 \times 10^3$ per day) | Suction Pressure (kPa) | Average Sales Rate ($m^3 \times 10^3$ per day) | Average Cash Flow ($ per day) |
|---|---|---|---|
| 5 | 200 | | |
| 5 | 150 | | |
| 5 | 100 | | |
| 5 | 50 | | |
| 5 | 0 | | |
| 5 | −50 | | |
| 4 | 200 | | |
| 4 | 150 | | |
| 4 | 100 | | |
| 4 | 50 | | |
| 4 | 0 | | |
| 4 | −50 | | |
| 3 | 200 | | |
| 3 | 150 | | |
| 3 | 100 | | |
| 3 | 50 | | |
| 3 | 0 | | |

If it is desired to optimize production from the well on the basis of gas production rate, the production test grid may be defined using selected input values for the following operational parameters, which are programmed into the PLC:

Tubing rate set point (TRSP) at start of test;
TRSP increment;
TRSP at end of test;
Suction pressure—start;
Suction pressure—end; and
Test duration (hours).

The PLC totalizes the gas production during each test period. Back pressure is kept constant for all tests to ensure that a true measurement of wellbore productivity is provided. After a desired number of these production tests have been completed, with the test results being used to populate Table 1 as appropriate, the combination of TRSP and suction pressure that resulted in the highest gas production during the tests will represent the optimum set point (OSP) for the wellbore. The PLC will save these values as the default operating parameters for the wellbore, and the system will revert to operating at these optimum conditions once the testing is complete.

Figure 11:
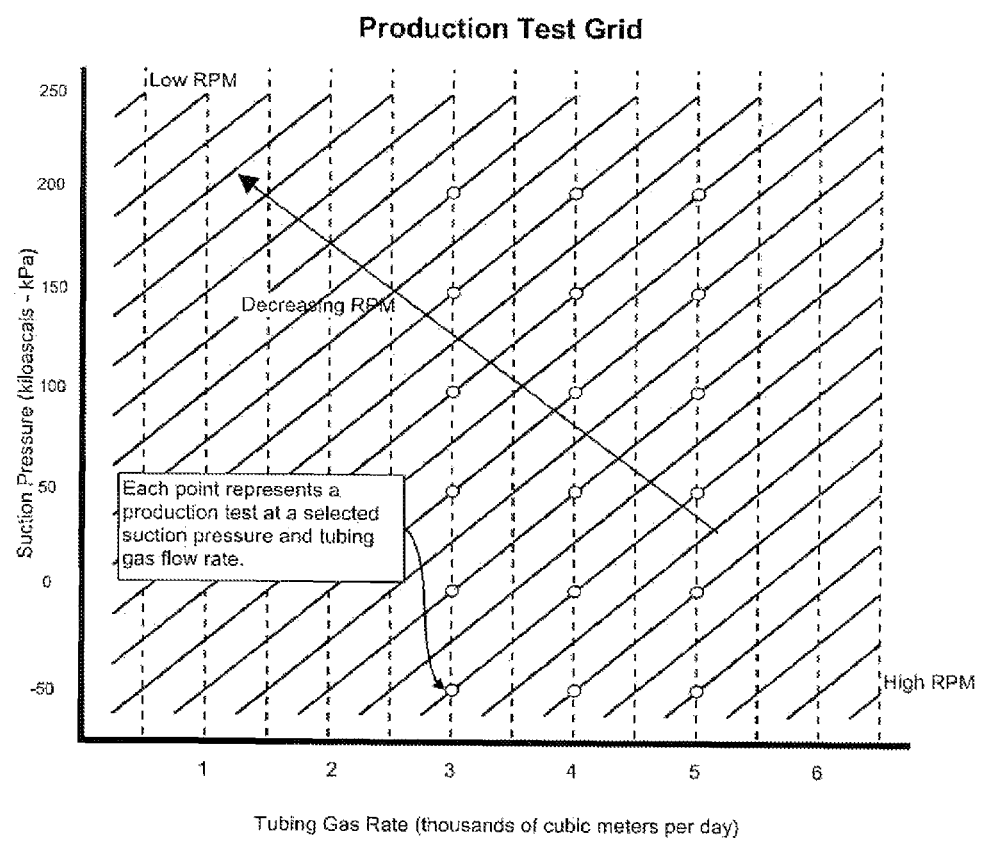
FIG. 11 illustrates an example of a production test grid for use in conjunction with gas production optimization methods in accordance with the present invention.

FIG. 11 provides a pictorial representation of data used for purposes of a production test grid as described above, with tubing rate being plotted against compressor suction pressure, with further reference to compressor speed (RPM). Each circular data point in FIG. 11 represents a particular combination of tubing rate and suction pressure inputs used in production testing.

If it is desired to optimize cash flow rather than gas production rate, additional inputs may be required for the production tests, such as:

Water disposal cost (per cubic meter);
Gas price (per cubic meter); and
Power cost (per kilowatt-hour).

The PLC totalizes gas and water production as well as power consumption during each test period. Back pressure is kept constant for all tests to ensure that a true indication of wellbore productivity is provided. The PLC uses the measured gas and water production data and the corresponding cost and price information to determine a cash flow indicator. After a desired number of these production tests have been completed, with the test results being used to populate Table 1 as appropriate, the combination of TRSP and suction pressure that resulted in the highest cash flow during the tests will represent the optimum set point (OSP) for the wellbore. These values will be saved as the default operating parameters for the wellbore, and the system will revert to operating at these optimum conditions once the production testing is complete.

After test procedures have been performed as described above, the system will have identified the parameters for optimum production with continuous removal of liquids. The optimization test grid will preferably be run on a periodic basis throughout the life of the well. In most cases, a very broad range of suction pressures and tubing gas rate values will be used the first time the test grid is run. Subsequent optimization runs will concentrate the test grid around the default optimum conditions determined from earlier tests. Based on the average time between liquid dumps, the system will determine whether the well should be tested for intermittent liquids removal. For example, if the time between dumps is 24 hours, there is a good chance that production improvements can be realized through intermittent liquid removal. In contrast, if the time between liquid dumps is, say, only 8 minutes, intermittent removal of liquids would not be an option, because this would almost certainly have the effect of killing the well.

Determining Viability of Intermittent Clean-Out

To determine whether intermittent removal of liquids is viable for a given wellbore, a new test grid is set up on the PLC, such as illustrated in Table 2 below:

TABLE 2

| Sub-critical flow time (minutes) | Average Sales Rate ($m^3 \times 10^3$ per day) | Average Cash Flow ($ per day) |
|---|---|---|
| Avg. dump time × .5 | | |
| Avg. dump time × .6 | | |
| Avg. dump time × .7 | | |
| Avg. dump time × .8 | | |
| Avg. dump time × .9 | | |
| Avg. dump time × 1.0 | | |

Sub-critical flow is a flow rate in the wellbore that does not provide sufficient velocity to lift liquids. Accordingly, the sub-critical flow time in Table 2 is the time during which the wellbore operates under sub-critical flow conditions. During this time liquids are slowly accumulated in the wellbore; however, friction loading is eliminated. Sub-critical flow can occur up the wellbore annulus alone or up the tubing and the annulus together.

If it is desired to assess the viability of intermittent clean-out for a given wellbore on the basis of optimizing gas production rate, the production test grid may be defined using selected input values for the following operational parameters:

Initial sub-critical flow duration, as a multiple of dump time (using the dump time multiple helps eliminate excessive liquid accumulations);
Sub-critical flow duration increment (multiple of dump time);
Clean-out cycle duration (minutes);
Suction pressure set point (as determined from the continuous clean-out test grid); and
Test duration (number of cycles).

The PLC totalizes the gas production during each test period, and then divides this total by the test duration to calculate an average daily gas rate. Back pressure is kept constant for all tests to ensure that a true indication of wellbore productivity is provided. Production test results are used to populate Table 2 as appropriate. At the completion of each sub-critical flow period, the system automatically reverts to the clean-out cycle (i.e., optimum parameters from continuous clean-out testing). The production testing continues until the average daily gas rate is less than the optimum rate. The system will revert to operating at these optimum conditions once the testing is complete.

From a practical standpoint, there are three conditions to be avoided in association with sub-critical flow, as follows:

1. Accumulated liquid should not be greater than surface facilities can handle, in order to prevent the compressor from being flooded.
2. Liquids should not be allowed to accumulate to the point that production is restricted.
3. Liquids must not be allowed to accumulate to the point that the compressor does not have capacity to remove them, or to the point that the hydrostatic pressure of the liquids exceeds the reservoir pressure.

Production testing will be terminated prematurely by the PLC (i.e., before the end of the specified test duration has been reached) if any of the above-mentioned conditions should develop. Otherwise, testing will continue until the end of the specified test period unless the well is producing less gas, in which case testing will be aborted and the well will revert to the previous operational parameters.

If it is desired to assess the viability of intermittent clean-out for a given wellbore on the basis of optimizing cash flow, definition of the production test grid may entail the use of inputs values for additional parameters, such as:

Water disposal cost (per cubic meter);
Gas price (per cubic meter); and
Power cost (per kilowatt-hour).

The PLC totalizes gas and water production as well as power consumption during each test period. These accumulations, combined with the costs and test duration, provide a daily cash flow indicator. Back pressure is kept constant for all tests to ensure that a true indication of wellbore productivity is provided. At the completion of each sub-critical flow period, the system automatically reverts to the clean-out cycle (i.e., optimum parameters from continuous clean-out testing). Production testing continues until the average daily cash flow rate is less than the daily cash flow indicator. The system will revert to operating at these optimum conditions once the testing is complete.

Production testing will be terminated prematurely by the PLC (i.e., before the end of specified test duration has been reached) if any of the above-mentioned conditions should develop. Otherwise testing will continue until the end of the specified test period unless the well is producing a reduced cash flow, in which case testing will be aborted and the well will revert to the previous operational parameters.

Gas Lift Application for an Oil Producer

Figure 12:
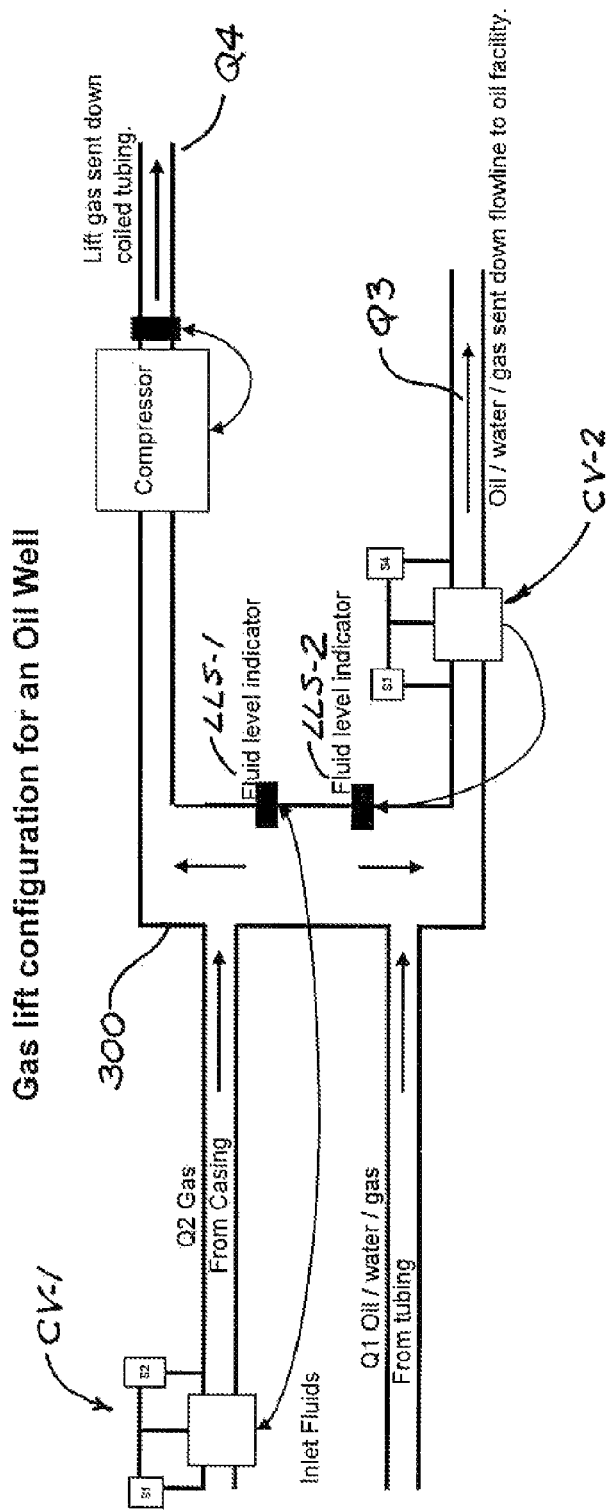
FIG. 12 is a schematic diagram of a gas lift system for a producing oil well in accordance with an embodiment of the present invention.
Figure 13:
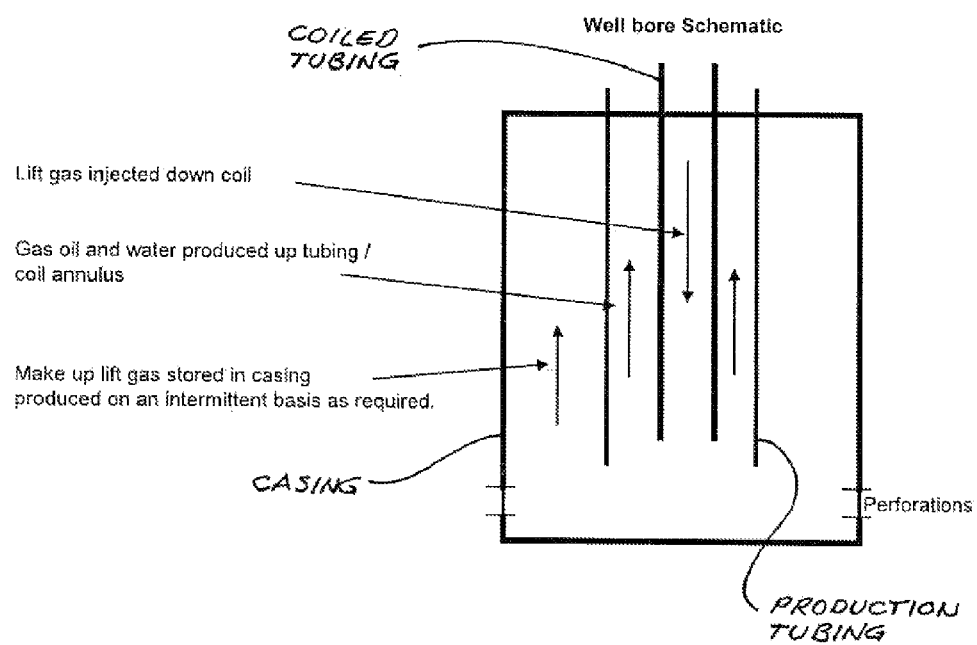
FIG. 13 is a schematic diagram of the wellbore of the system illustrated in FIG. 12.

FIGS. 12 and 13 illustrate how principles and concepts taught herein may also be applied to enable a simple compressor to provide onsite gas lift for a producing oil well. Produced gas is separated at the surface, and a portion of the produced gas re-injected into the wellbore through a coiled tubing string. This gas lift gas lightens the fluid column in the wellbore and facilitates production of liquids up the wellbore by pressure-induced flow (as opposed to velocity-induced flow). The well casing in this scenario will typically be closed, resulting in an accumulation of high-pressure gas within the casing. Anytime additional gas lift gas is required for the system, this high-pressure gas stored in the casing may be utilized for that purpose.

In the embodiment illustrated in FIG. 12, process block 300 conceptually represents a flow-splitting apparatus. A first input flow Q1 is a flow of oil emulsion from a wellbore. A second input flow Q2 is gas flow from the wellbore casing. A first output flow Q3 is a flow of oil emulsion down a flow line. A second output flow Q4 is a flow of lift gas flow down the coiled tubing. It will be noted that all of the gas lift gas passes through the compressor.

A first control valve CV-1 (which may be in accordance with a control valve embodiment disclosed elsewhere in this patent document) is controlled by a first liquid level sensor LLS-1 (alternatively referred to as a fluid level indicator). If first liquid level sensor LLS-1 is down, first control valve CV-1 will be closed. If first liquid level sensor LLS-1 is up, first control valve CV-1 will open. First control valve CV-1 attempts to maintain the liquid level below first liquid level sensor LLS-1.

A second control valve CV-2 is controlled based on second liquid level sensor LLS-2. If second liquid level sensor LLS-2 is down, second control valve CV-2 will be closed. If second liquid level sensor LLS-2 is up, second control valve CV-2 will open. Second control valve CV-2 attempts to maintain a liquid level above second liquid level sensor LLS-2.

The combined action of these two control valves attempts to maintain a liquid level in the process vessel between the two level switches. Based on the liquid level sensed by a given liquid level sensor, the associated control valve will be further opened or closed; i.e., the control valve will pulse open in response to an increase in the liquid level, and closed (or less open) in response to a decrease in the liquid level. Compressor throughput is controlled by a variable-frequency drive (VFD).

It will be readily appreciated by those skilled in the art that various modifications of the present invention may be devised without departing from the scope and teaching of the present invention, including modifications which may use equivalent structures or materials hereafter conceived or developed. It is to be especially understood that the invention is not intended to be limited to any described or illustrated embodiment, and that the substitution of a variant of a claimed element or feature, without any substantial resultant change in the working of the invention, will not constitute a departure from the scope of the invention. It is to also be appreciated that the different teachings of the embodiments described and discussed herein may be employed separately or in any suitable combination to produce desired results.

In this patent document, any form of the word "comprise" is to be understood in its non-limiting sense to mean that any item following such word is included, but items not specifically mentioned are not excluded. A reference to an element by the indefinite article "a" does not exclude the possibility that more than one of the element is present, unless the context clearly requires that there be one and only one such element. Any use of any form of the terms "connect", "engage", "couple", "attach", or any other term describing an interaction between elements is not meant to limit the interaction to direct interaction between the subject elements, and may also include indirect interaction between the elements such as through secondary or intermediary structure.

What is claimed is:

1. A non-venting control valve assembly for installation in a flow line carrying a fluid under pressure, said control valve assembly comprising:
   (a) a bladder-type valve having: a valve core; a generally cylindrical bladder having a bladder wall, said bladder surrounding the valve core; a fluid inlet; a fluid outlet; and a pressure port whereby the bladder can be exposed to external pressure;
   (b) a pressure source in fluid communication with the pressure port;
   (c) an upstream bypass line connecting the fluid inlet and the pressure source;
   (d) an upstream solenoid operable to regulate fluid flow through the upstream bypass line;
   (e) a downstream bypass line connecting the fluid outlet and the pressure source; and
   (f) a downstream solenoid operable to regulate fluid flow through the downstream bypass line;
   wherein:
   (g) the valve core comprises a pair of frustoconical valve core sections, each having a perforated conical sidewall, a solid end wall, and an opposing open end, with the solid end walls of said sections in adjacent juxtaposition;
   (h) a positive pressure differential across the bladder wall will urge the bladder against the conical sidewalls of the valve core sections so as to prevent fluid flow through said perforations; and
   (i) a negative pressure differential across the bladder wall will urge the bladder away from the conical sidewalls of the valve core sections so as to allow fluid flow through said perforations.

2. A non-venting control valve assembly for installation in a flow line carrying a fluid under pressure, said control valve assembly comprising:
   (a) a bladder-type valve having: a valve core; a generally cylindrical bladder having a bladder wall, said bladder surrounding the valve core; a fluid inlet; a fluid outlet; and a pressure port whereby the bladder can be exposed to external pressure;
   (b) a pressure source in fluid communication with the pressure port;
   (c) an upstream bypass line connecting the fluid inlet and the pressure source;
   (d) an upstream solenoid operable to regulate fluid flow through the upstream bypass line;
   (e) a downstream bypass line connecting the fluid outlet and the pressure source; and
   (f) a downstream solenoid operable to regulate fluid flow through the downstream bypass line;
   wherein:
   (g) a positive pressure differential across the bladder wall will urge the bladder against the valve core so as to prevent fluid flow through the valve; and
   (h) a negative pressure differential across the bladder wall will urge the bladder away from the valve core so as to allow fluid flow through the valve.

3. A control valve assembly as in claim 1, further comprising a programmable logic controller (PLC) adapted to control the operation of the upstream and downstream solenoids.

4. A control valve assembly as in claim 3 wherein the PLC controls the operation of the upstream and downstream solenoids in response to data inputs from a pressure sensor associated with the fluid inlet.

5. A control valve assembly as in claim 3 wherein the PLC controls the operation of the upstream and downstream solenoids in response to data inputs from a flow rate sensor associated with a fluid source upstream of the fluid inlet.

6. A control valve assembly as in claim 3 wherein the PLC controls the operation of the upstream and downstream solenoids in response to data inputs from a control sensor which measures a flow variable selected from the group consisting of fluid pressure, fluid flow rate, and fluid temperature.

7. A control valve assembly as in claim 6 wherein flow variable measured by the control sensor is sensed indirectly.

8. A control valve assembly as in claim 3 wherein the fluid under pressure is a gas, and wherein the PLC controls the operation of the upstream and downstream solenoids in response to data inputs from a motor RPM sensor which measures the speed of a motor associated with a gas compressor.

9. A method of regulating flow in a flow line carrying a fluid under pressure, said method comprising the steps of:
   (a) providing a control valve assembly comprising:
      a.1 a bladder-type valve having: a valve core; a generally cylindrical bladder having a bladder wall, said bladder surrounding the valve core; a fluid inlet; a fluid outlet; and a pressure port whereby the bladder wall can be exposed to external pressure;
      a.2 a pressure source in fluid communication with the pressure port;
      a.3 an upstream bypass line connecting the fluid inlet and the pressure source;
      a.4 an upstream solenoid operable to regulate fluid flow through the upstream bypass line;
      a.5 a downstream bypass line connecting the fluid outlet and the pressure source; and
      a.6 a downstream solenoid operable to regulate fluid flow through the downstream bypass line;
   (b) installing said control valve assembly in the flow line, with the upstream section of the flow line connected to the fluid inlet of the control valve assembly, and with the downstream section of the flow line connected to the fluid outlet of the control valve assembly; and
   (c) closing the downstream solenoid and opening the upstream solenoid, thereby equalizing the external pressure against the bladder with the upstream pressure in the upstream section of the flow line and consequently preventing fluid flow through the valve.

10. A method of regulating flow in a flow line as in claim 9, comprising the further steps of opening the downstream solenoid and closing the upstream solenoid, thereby reducing the pressure against the bladder to less than the upstream pressure and consequently allowing fluid flow through the valve.

11. A method of regulating flow in a flow line as in claim 10, comprising the further step of pulsing the downstream solenoid to increase fluid flow through the valve.

12. A method of regulating flow in a flow line as in claim 10, comprising the further step of pulsing the upstream solenoid to decrease fluid flow through the valve.

13. A method of regulating flow in a flow line as in claim 9 wherein the control valve assembly further comprises a programmable logic controller (PLC) adapted to control the operation of the upstream and downstream solenoids.

14. A method of regulating flow in a flow line as in claim 13 wherein the PLC controls the operation of the upstream and downstream solenoids in response to data inputs from a pressure sensor associated with the fluid inlet.

15. A method of regulating flow in a flow line as in claim 13 wherein the PLC controls the operation of the upstream and downstream solenoids in response to data inputs from a flow rate sensor associated with a fluid source upstream of the fluid inlet.

16. A method of regulating flow in a flow line as in claim 13 wherein the PLC controls the operation of the upstream and downstream solenoids in response to data inputs from a control sensor which measures a flow variable selected from the group consisting of fluid pressure, fluid flow rate, and fluid temperature.

17. A method of regulating flow in a flow line as in claim 16 wherein flow variable measured by the control sensor is sensed indirectly.

18. A method of regulating flow in a flow line as in claim 13 wherein the fluid under pressure is a gas, and wherein the PLC controls the operation of the upstream and downstream solenoids in response to data inputs from a motor RPM sensor which measures the speed of a motor associated with a gas compressor.

\* \* \* \* \*